United States Patent
Guilbeault et al.

(10) Patent No.: US 11,848,871 B2
(45) Date of Patent: Dec. 19, 2023

(54) NETWORK SLICE MANAGEMENT

(71) Applicant: Nokia Solutions and Networks Oy, Espoo (FI)

(72) Inventors: Frederic Guilbeault, Murray Hill, NJ (US); Yves Beauville, Murray Hill, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/646,412

(22) PCT Filed: Oct. 19, 2018

(86) PCT No.: PCT/US2018/056706
§ 371 (c)(1),
(2) Date: Mar. 11, 2020

(87) PCT Pub. No.: WO2019/083841
PCT Pub. Date: May 2, 2019

(65) Prior Publication Data
US 2020/0274764 A1    Aug. 27, 2020

Related U.S. Application Data

(60) Provisional application No. 62/575,797, filed on Oct. 23, 2017.

(51) Int. Cl.
*G06F 15/177* (2006.01)
*H04L 47/70* (2022.01)
(Continued)

(52) U.S. Cl.
CPC .......... *H04L 47/70* (2013.01); *H04L 12/4641* (2013.01); *H04L 41/0286* (2013.01);
(Continued)

(58) Field of Classification Search
CPC . H04L 47/70; H04L 12/4641; H04L 41/0286; H04L 41/0806; H04L 41/0816;
(Continued)

(56) References Cited

U.S. PATENT DOCUMENTS 8,103,731 B2 *  1/2012  Ji ....................... H04L 41/0681
                                                  709/206
10,708,368 B1   7/2020  Young et al.
(Continued)

FOREIGN PATENT DOCUMENTS

CN      102893642 A    1/2013
EP       2139161 A1   12/2009
(Continued)

OTHER PUBLICATIONS

Extended European Search Report dated Jul. 16, 2021 in European Application No. 18869538.1.
(Continued)

*Primary Examiner* — Atta Khan
(74) *Attorney, Agent, or Firm* — Harness, Dickey & Pierce, P.L.C.

(57) ABSTRACT

Methods, apparatuses and computer readable storage mediums provide virtual network slicing without duplicating network configuration data (also referred to as network configuration information) on a slice-by-slice basis by maintaining a single physical network datastore including network configuration information for all network entities in the physical network, but generating slice views for respective virtual network slices as needed over time. Methods, apparatuses and computer readable storage mediums also enable configuration of a plurality of virtual network slices sharing a physical network infrastructure.

16 Claims, 27 Drawing Sheets

(51) Int. Cl.

| | |
|---|---|
| *H04L 12/46* | (2006.01) |
| *H04L 41/0853* | (2022.01) |
| *H04L 43/028* | (2022.01) |
| *H04L 41/0273* | (2022.01) |
| *H04L 41/0806* | (2022.01) |
| *H04L 41/0816* | (2022.01) |
| *H04L 41/12* | (2022.01) |
| *H04L 41/0213* | (2022.01) |
| *H04L 9/40* | (2022.01) |
| *H04L 41/0803* | (2022.01) |

(52) U.S. Cl.
CPC ...... *H04L 41/0806* (2013.01); *H04L 41/0816* (2013.01); *H04L 41/0853* (2013.01); *H04L 41/0856* (2013.01); *H04L 43/028* (2013.01); *H04L 41/0213* (2013.01); *H04L 41/0803* (2013.01); *H04L 41/12* (2013.01); *H04L 63/10* (2013.01)

(58) Field of Classification Search
CPC ............. H04L 41/0853; H04L 41/0856; H04L 43/028; H04L 41/0213; H04L 41/0803; H04L 41/12; H04L 63/10
USPC ......................................................... 709/221
See application file for complete search history.

(56) References Cited

U.S. PATENT DOCUMENTS

| | | | |
|---|---|---|---|
| 2010/0057849 A1* | 3/2010 | Ji | ........................ H04L 41/0681 709/222 |
| 2012/0233302 A1 | 9/2012 | Kallin et al. | |
| 2014/0071899 A2 | 3/2014 | Riggio et al. | |
| 2014/0372617 A1 | 12/2014 | Houyou et al. | |
| 2015/0358399 A1 | 12/2015 | Baugher et al. | |
| 2016/0156513 A1 | 6/2016 | Zhang et al. | |
| 2017/0026856 A1 | 1/2017 | Thomas et al. | |
| 2017/0054595 A1* | 2/2017 | Zhang | ................. H04L 41/0896 |
| 2017/0141973 A1* | 5/2017 | Vrzic | ..................... H04W 76/11 |
| 2017/0164212 A1* | 6/2017 | Opsenica | ................. G06F 16/41 |
| 2018/0310238 A1 | 10/2018 | Opsenica et al. | |
| 2018/0359337 A1 | 12/2018 | Kodaypak et al. | |
| 2019/0037409 A1 | 1/2019 | Wang et al. | |
| 2019/0158505 A1 | 5/2019 | An et al. | |
| 2019/0174321 A1 | 6/2019 | Sun et al. | |
| 2019/0174498 A1 | 6/2019 | Samdanis et al. | |
| 2019/0246270 A1 | 8/2019 | Ito et al. | |
| 2019/0357122 A1 | 11/2019 | Li et al. | |
| 2020/0228405 A1 | 7/2020 | Fang | |

FOREIGN PATENT DOCUMENTS

| | | |
|---|---|---|
| EP | 2166699 A1 | 3/2010 |
| WO | WO-2017/058067 A1 | 4/2017 |

OTHER PUBLICATIONS

Qiang, L. et al: "Gap Analysis for Transport Network Slicing; draft-qiang-netslices-gap-analysis-01.txt," Gap Analysis for Transport Network Slicing; Draft-Qiang-NETslices-Gap-Analysis-01.txt: Internet-Draft: None, Internet Engineering Task Force, IETF; Standardworkingdraft, Internet Society (ISOC) 4, Rue Des Falaises CH—1205 Geneva, Switzerland, No. 1, Jul. 3, 2017 (Jul. 3, 2017), pp. 1-26, XP015120671, [retrieved on Jul. 3, 2017].
Lee, Young et al.: "Traffic Engineering and Service Mapping Yang Model; draft-iee-teas-te-service-mapping-yang-01.txt", Traffic Engineering and Service Mapping Yang Model; Draft-Lee-Teas TE-Service-Mapping-Yang-01. Txt: Internet-Draft: Teas WG, Internet Engineering Task Force, IETF; Standardworkingdraft, Internet Society (ISOC) 4, Rue Des Falaises Ch—1205 Geneva, Swit, No. 1, Jun. 30, 2017 (Jun. 30, 2017), pp. 1-19, XP015120481, [retrieved on Jun. 30, 2017].
Extended European Search Report dated Mar. 4, 2020 in European Application No. 19215520.8.
"3rd Generation Partnership Project; Technical Specification Group Services and System Aspects; Telecommunication management; Study on management and Orchestration of network slicing for next generation network(release 15)", 3 GPP Standard; 3GPP TR 28.801, pp. 1-78. vol. SA WG5, No. V15.0.0, Sep. 25, 2017.
L. Qiang, et al., "Technology Independent Information Model for Network Slicing; draft-qiang-coms-netslicing-information-model-01.txt", IETF; Standardworkingdraft, Internet Society(ISOC), No. 1, Oct. 30. 2017. pp. 1-25.
"3rd Generation Partnership Project; Technical Specification Group Services and System Aspects; Feasibility Study on Business Role Models for Network Slicing (Release 16))", 3 GPP Standard; 3GPP TR 22.830, pp. 1-25, vol. SG WG1, No. V16.0.0, Sep. 21, 2018.
Nokia et al., "FS_BMNS terminology alignment", 3GPP Draft; S1-182481 Terminology Alignment, vol. SA WG1, No. West Palm Beach, FL, USA; Aug. 20, 2018-Aug. 24, 2018, Aug. 29, 2018.
International Preliminary Report on Patentability dated May 7, 2020 in International Application No. PCT/US2018/056714.
International Preliminary Report on Patentability dated May 7, 2020 in International Application No. PCT/US2018/056706.
Office Action for U.S. Appl. No. 16/227,105 dated Mar. 6, 2020.
CA Office Action for U.S. Appl. No. 16/646,385 dated Jun. 24, 2021.
International Search Report and Written Opinion dated Feb. 25, 2019 in International Application No. PCT/US2018/056714.
International Search Report and Written Opinion dated Jan. 3, 2019 in International Application No. PCT/US2018/056706.
R. Enns, et al., "Network Configuration Protocol (NETCONF)," Request for Comment (RFC) 6241, Internet Engineering Task Force(IETF), Jun. 2011.
M. Bjorklund, "YANG—A Data Modeling Language for the Network Configuration Protocol (NETCONF)," Request for Comments (RFC) 6020, Internet Engineering Task Force (IETF), Oct. 2010.
Robert Peschi, "WT-385: ITU-T Pon Yang Modules," The Broadband Forum, Mar. 2017.
K. McCloghrie, et al., "Management Information Base for Network Management of TCP/IP-based internets," Request for Comments (RFC) 1066, Network Working Group, Aug. 1988.
"Fixed Access Network Sharing—Architecture and Nodal Requirements," WT-370, Broadband forum, Jan. 2016.
Bruno Comaglia of Vodafone Group Services, "FANS—Access Network Sharing Interfaces," WT-386, Broadband Forum, Jun. 2016.
Huawei, "Network Slicing Architecture; draft-geng-netslices-architecture-01," IETF Trust, Jun. 2, 2017 (retrieved from https://tools.ietf.org/id/draft-geng-netslices-architecture-01.html).
Bruno Cornaglia of Vodafone Group Services, "FANS—Access Network Sharing Interfaces," TR-386, Broadband Forum, Jan. 2019.
"Fixed Access Network Sharing—Architecture and Nodal Requirements," TR-370, Broadband forum, Nov. 2017.
Robert Peschi, "TR-385: ITU-T Pon Yang Modules," The Broadband Forum, Apr. 2019.
Extended European Search Repor dated Jun. 14, 2021 in European Application No. 18871429.9.
Office action dated Feb. 25, 2022, issued in corresponding U.S. Appl. No. 16/646,385.
Office Action dated Sep. 6, 2022 issued in corresponding U.S. Appl. No. 16/646,385.
Final Office Action Corresponding to U.S. Appl. No. 16/646,385, dated Apr. 28, 2023.

* cited by examiner

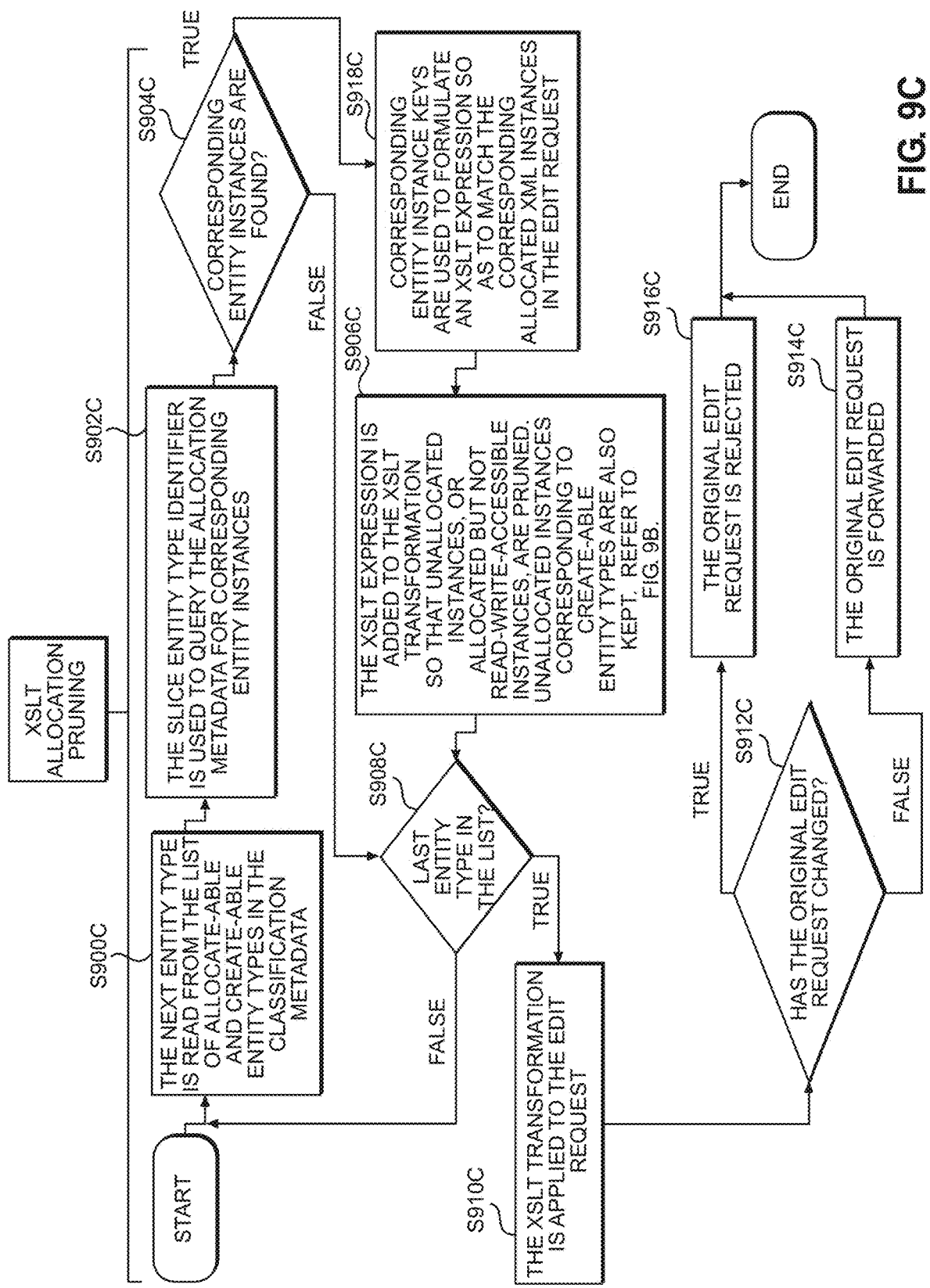

NETWORK SLICE MANAGEMENT

CROSS-REFERENCE TO RELATED APPLICATIONS

This application is a National Phase under 35 U.S.C. § 371 of PCT International Application No. PCT/US2018/056706, which has an international filing date of Oct. 19, 2018, and which claims priority to provisional U.S. patent application No. 62/575,797, filed on Oct. 23, 2017, the entire contents of both of which are incorporated herein by reference.

BACKGROUND

Virtual network slicing (also referred to as network slicing or slicing) allows multiple logical or virtual networks to be created on top of a common shared physical network infrastructure.

SUMMARY

One or more example embodiments enable virtual network slicing without duplicating network configuration data (also referred to as network configuration information) on a slice-by-slice basis by maintaining a single physical network datastore, using a network management entity in a centralized location, but generating slice views of the physical network datastore for respective virtual network slices as needed over time.

One or more example embodiments also provide methods to define, configure and manage virtual network slices by utilizing two complementary approaches: (1) classification of network configuration models; and (2) run-time allocation and/or assignment of entity instances to virtual network slices. According to one or more example embodiments, run-time allocation and/or assignment of entity instances to virtual network slices refers to the addition of slicing configuration (on top of classification) based on network provisioning data instantiated into a database (e.g., at the physical network datastore) at run-time. This virtual network slice configuration points to specific instances of network provisioning artifacts in the database, and may be specified only after network provisioning is persisted into a database at run-time.

At least one example embodiment provides a network management system for managing a plurality of virtual network slices in a physical network, the network management system including at least one processor and at least one memory storing computer readable instructions. The at least one processor is configured to execute the computer readable instructions to cause the network management system to: filter network information to obtain filtered network information, the filtered network information including network information for only network entities assigned to a first of the plurality of virtual network slices, and the network information including at least one of (i) operational information obtained from the physical network or (ii) network configuration information obtained from a physical network datastore; and provide the filtered network information to a first slice owner of the first of the plurality of virtual network slices.

At least one example embodiment provides a network management system for managing a plurality of virtual network slices in a physical network, the network management system including: means for filtering network information to obtain filtered network information, the filtered network information including network information for only network entities assigned to a first of the plurality of virtual network slices, and the network information including at least one of (i) operational information obtained from the physical network or (ii) network configuration information obtained from a physical network datastore; and means for providing the filtered network information to a first slice owner of the first of the plurality of virtual network slices.

At least one example embodiment provides a method for managing a plurality of virtual network slices in a physical network, the method comprising: filtering network information to obtain filtered network information, the filtered network information including network information for only network entities assigned to a first of the plurality of virtual network slices, and the network information including at least one of (i) operational information obtained from the physical network or (ii) network configuration information obtained from a physical network datastore; and providing the filtered network information to a first slice owner of the first of the plurality of virtual network slices.

At least one example embodiment provides a non-transitory computer readable storage medium storing computer-executable instructions that, when executed by one or more processors of a network management system, cause the network management system to perform a method for managing a plurality of virtual network slices in a physical network, the method comprising: filtering network information to obtain filtered network information, the filtered network information including network information for only network entities assigned to a first of the plurality of virtual network slices, and the network information including at least one of (i) operational information obtained from the physical network or (ii) network configuration information obtained from a physical network datastore; and providing the filtered network information to a first slice owner of the first of the plurality of virtual network slices.

According to one or more example embodiments, the filtered network information may be provided via a NETCONF message (e.g., a NETCONF RESPONSE or NOTIFICATION message). The network information may be filtered in response to a request message from the first slice owner. The request message may be a NETCONF message. The NETCONF message may be one of a GET, GET-CONFIG or EDIT-CONFIG message. The request message from the first slice owner may also be filtered.

The request message may be encoded in XML, and may be filtered by applying at least one (e.g., XSLT) transformation to the request message to generate a transformed request message. The network information may be filtered in response to the transformed request message.

The request message may be filtered by applying a plurality of XSLT transformations (e.g., sequentially) to generate the transformed request message. The plurality of XSLT transformations may include XSLT classification pruning, XSLT allocation pruning, XSLT validation and XSLT tagging.

A candidate datastore may be modified based on the request message, a determination whether the modified candidate datastore is valid may be made, and the physical network datastore may be selectively updated according to the modified candidate datastore based on whether the modified candidate datastore is valid.

The physical network datastore may be updated in response to determining that the modified candidate datastore is valid, whereas the modified candidate datastore may be rejected in response to determining that the modified candidate datastore is not valid.

The network information may be in the form of an encoded document, and the network information may be filtered by applying at least one transformation to the encoded document to generate a transformed encoded document including the filtered network information.

The physical network datastore may store network information for all network entities in the physical network.

At least one example embodiment provides a network management system for configuring a plurality of virtual network slices sharing a physical network infrastructure, the network management system including: at least one processor and at least one memory storing computer readable instructions. The at least one processor is configured to execute the computer readable instructions to cause the network management system to: apply a classification to network entities within the physical network infrastructure based on configurability of the network entities in the plurality of virtual network slices; and assign instances of the network entities based on the classification applied to the network entities.

At least one example embodiment provides a network management system for configuring a plurality of virtual network slices sharing a physical network infrastructure, the network management system including: means for applying a classification to network entities within the physical network infrastructure based on configurability of the network entities in the plurality of virtual network slices; and means for assigning instances of the network entities based on the classification applied to the network entities.

At least one other example embodiment provides a method for configuring a plurality of virtual network slices sharing a physical network infrastructure, the method including: applying a classification to network entities within the physical network infrastructure based on configurability of the network entities in the plurality of virtual network slices; and assigning instances of the network entities based on the classification applied to the network entities.

At least one other example embodiment provides a non-transitory computer readable storage medium storing computer-executable instructions that, when executed by one or more processors of a network management system, cause the network management system to perform a method for configuring a plurality of virtual network slices sharing a physical network infrastructure, the method including: applying a classification to network entities within the physical network infrastructure based on configurability of the network entities in the plurality of virtual network slices; and assigning instances of the network entities based on the classification applied to the network entities.

According to at least some example embodiments, the classification for a first network entity among the network entities may indicate at least one of: the first network entity is visible to a slice owner of a virtual network slice among the plurality of virtual network slices; the first network entity is accessible by the slice owner for read/write purposes; or the first network entity is create-able by the slice owner in the virtual network slice.

The classification may be applied via metadata for the first network entity stored at a physical network datastore. The metadata for the first network entity may include metadata, which may indicate whether an instance of the first network entity has been explicitly assigned to the virtual network slice.

At least one example embodiment provides a network element including: at least one memory including a datastore storing network configuration information for a physical network infrastructure shared by at least a first virtual network slice and a second virtual network slice, the first virtual network slice identified by a first unique tag and the second virtual network slice identified by a second unique tag, the network configuration information including first virtual network slice configuration information associated with the first virtual network slice and second virtual network slice configuration information associated with the second virtual network slice. The first virtual network slice configuration information is stored in association with the first unique tag, the second virtual network slice configuration information is stored in association with the second unique tag, and the first unique tag and the second unique tag cause a network management entity to provide a first slice owner of the first virtual network slice with the first virtual network slice configuration information, but not the second virtual network slice configuration information, in response to a first request from the first slice owner.

According to at least some example embodiments, the second unique tag may cause the network management entity to provide a second slice owner of the second virtual network slice with the second virtual network slice configuration information, but not the first virtual network slice configuration information, in response to a second request from the second slice owner. The first unique tag may be a prefix or suffix with a data key value.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

FIG. 9C is a flow chart illustrating a method according to one or more example embodiments.

Figure 1:
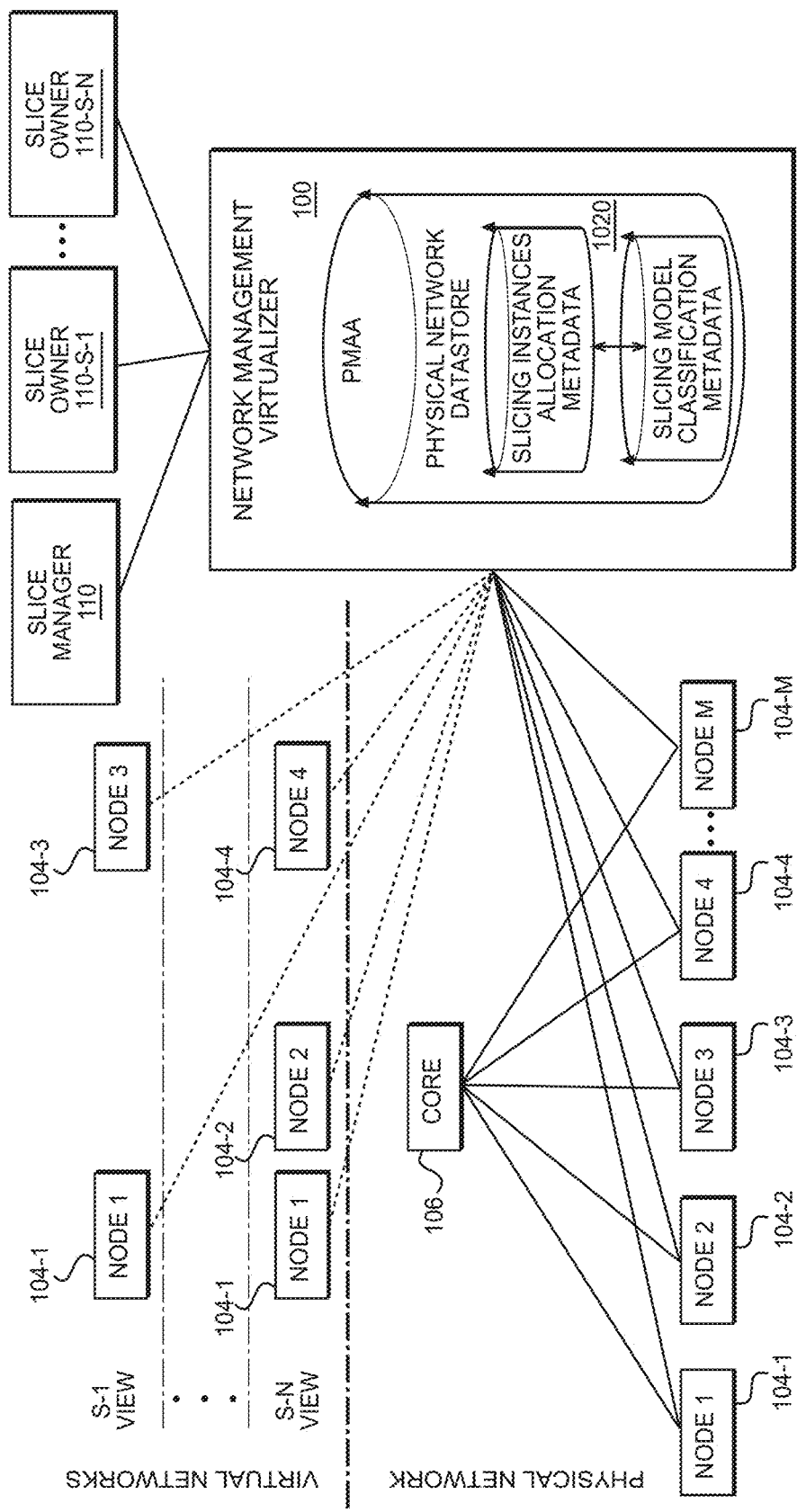
FIG. 1 is a block diagram illustrating a physical network architecture including a plurality of virtual network slices and a network management virtualizer, according to one or more example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Example embodiments will be discussed with regard to a NETCONF-managed network. However, it should be understood that example embodiments may also be applicable to other networks, such as Simple Network Management Protocol (SNMP)-managed networks and the like. The NETCONF protocol is defined in RFC 6241 and SNMP is defined in RFC 1066. These protocols define mechanisms through which network devices may be managed, configuration data information can be retrieved, and new configuration data can be uploaded and manipulated.

FIG. 1 is a simplified block diagram illustrating a physical network architecture including a plurality of virtual network slices and a network management virtualizer, according to one or more example embodiments.

Referring to FIG. 1, the physical network architecture (also referred to as a physical network infrastructure or physical network) is an example of a shared physical network on top of which a plurality of virtual network slices S-1 through S-N are created. Each virtual network slice S-1 through S-N corresponds to a virtual network and a set of virtual network devices assigned to the virtual network.

The physical network architecture includes a plurality of network nodes 104-1, 104-2, 104-3, 104-4, . . . , 104-M, which are connected to a core network 106. In the example shown in FIG. 1, the set of virtual network devices assigned to virtual network slice S-1 includes nodes 104-1 and 104-3 and the set of virtual network devices assigned to the virtual network slice S-N includes nodes 104-1, 104-2 and 104-4. Although discussed herein with regard to nodes, the set of virtual devices may include network nodes, entity instances within network nodes, and the like, which are in communication with the core network 106.

The example embodiment shown in FIG. 1 represents a tree network topology, and example embodiments will be discussed herein with regard to the tree network topology for example purposes. It should be understood, however, that example embodiments may be applicable to other network topologies (e.g., ring, mesh, star, fully connected, line, bus, etc.) and/or other device types; that is, for example, example embodiments may be applicable to networks irrespective of network topology or device type.

Each respective virtual network slice S-1 through S-N is accessible and managed by a respective slice owner 110-S-1 through 110-S-N. Each slice owner 110-S-1 through 110-S-N has access to only their respective virtual network slice. An example of a slice owner is a virtual network operator (VNO) for a network provider, which utilizes the physical network infrastructure of another network provider. By contrast, the entire physical network, including all virtual network slices, is accessible and managed by a slice manager 110. The slice manager 110 acts as a "super user," which is able to configure any and all aspects of the physical network. In a more specific example, the slice manager 110 may be similar to a super user in the UNIX platform.

According to one or more example embodiments discussed herein, the slice owners 110-S-1 through 110-S-N and the physical network devices may be slicing unaware, such that a slice owner sees only a slice subset of the network physical resources and is unaware of the virtual network slicing. Although example embodiments will be discussed herein with regard to slicing unaware slice owners and physical network devices, it should be understood that example embodiments may be applicable to scenarios in which the physical network devices and/or one or more slice owners are slicing aware.

Still referring to FIG. 1, the physical network architecture further includes a network management virtualizer 100, which includes a physical network datastore 1020. The network management virtualizer 100 may be implemented on a hardware computing platform at, for example, a network management entity. The hardware computing platform may be built around multiple server boards utilizing processing circuitry (e.g., one or more processors or processing cores).

According to one or more example embodiments, the network management virtualizer 100 and/or the physical network datastore 1020 may be located at a network management entity, which may be located at central office (CO) or distributed in the cloud via a cloud architecture. For a NETCONF-managed network, the physical network datastore 1020 stores network configuration for the physical network infrastructure. The physical network datastore 1020 may be stored in a memory at a network management entity.

In one example, a network management entity may be a network management server that is separate from network devices, and that may connect and manage multiple networks or network devices remotely. Alternatively, the network management entity may be distributed among multiple different network management servers in a cloud architecture.

According to one or more example embodiments, virtual network slicing discussed herein may transcend the architecture of the network virtualizer (or entity in which slicing is implemented), including where containers, virtual machines, or bare metal is used, as well as aspects of the run-time environment. If implemented in the cloud, example embodiments may or may not be distributed (e.g., example embodiments may be in the cloud and may be distributed or centralized).

In the example shown in FIG. 1, the physical network datastore 1020 is a NETCONF datastore storing network configuration information as encoded eXtensible Markup Language (XML) documents and files. However, an equivalent datastore for SNMP network devices is referred to as a Management Information Base (MIB).

Example embodiments are discussed herein with regard to pairing XML encoding with XML Stylesheet Language for Transformations (XSLT) and XQuery. It should be understood, however, that example embodiments should not be limited to this example. Rather, any transformation technology with respect to any encoding (e.g., comparable to XSLT with respect to XML encoding) may be used.

The network management virtualizer 100 may enable virtual network slicing from a single physical network datastore, residing in the management layer, without duplicating data across multiple physical network datastores on a slice-by-slice basis. The single physical network datastore may store network configuration information for the entire physical network and may be used for Persistence Management Agent Aggregation (PMAA); that is, offline provisioning across all network devices.

Still referring to FIG. 1, the network management virtualizer 100 is in communication with each of the nodes 104-1 through 104-M in the physical network. At the direction of slice owners 110-S-1 through 110-S-N or the slice manager 110, the network management virtualizer 100 implements configuration and management of the virtual network slices S-1 through S-N, and virtual network devices assigned thereto, within the physical network.

Network configuration for a physical network infrastructure depends on the models used to configure individual devices in the physical network as well as the model used to configure the network manager managing the physical network. In the case of NETCONF, network models are typically defined in YANG. YANG is a data modelling language used to model configuration and state data manipulated by NETCONF, NETCONF remote procedure calls (RPCs), and NETCONF notifications. YANG is defined in RFC 6020. Given the tree nature of YANG models, individual network entities can be leaves and sets thereof can be subtrees.

As mentioned above, example embodiments will be discussed herein with regard to a NETCONF-managed network. In this regard, example embodiments will be discussed with regard to NETCONF, a NETCONF model and the YANG model.

Although access networks may lend themselves to devices aligned with standard YANG models (e.g., Broadband Forum (BBF) WT-385), example embodiments should not be limited to this example. Rather, example embodiments may transcend the use of any device YANG model and/or any network type.

An "entity type" is a NETCONF model entry that represents a network "resource" residing in either the network manager or a network device. A network resource is considered configured once an "entity instance" corresponding to the network "resource" (entity type) has been created in the physical network datastore 1020, and the entity attributes are then populated as needed. An "entity type" is the definition of the entity in the model.

An "entity instance" or "network entity instance" is an embodiment of the "entity type" once the entity type has been instantiated and inserted as a distinct entry into the physical network datastore 1020.

One or more example embodiments also provide methods to define, configure and manage virtual network slices by utilizing classification of network configuration models and run-time allocation and/or assignment of entity instances to virtual network slices.

Classification of network configuration models allows for defining of boundaries within the models of what entity types are visible and modifiable by a slice owner in a virtual network slice. Different entity types in the models are classified based on their configurability in a virtual network slice, and network entities may be assigned to a virtual network slice according to their classification.

Individual entities or sets thereof may be uniquely identifiable using keys indicative of the corresponding network models.

Run-time allocation and/or assignment of entity instances to virtual network slices refers to the addition of slicing configuration (on top of classification) based on network provisioning data instantiated into a database (e.g., at the physical network datastore) at run-time. This virtual network slice configuration points to specific instances of network provisioning artifacts in the database, and may be specified only after network provisioning is persisted into a database at run-time. A slice manager may explicitly assign entity instances to a given virtual network slice. In addition, the slice manager may specify whether the entity instances are read-only or read-write accessible.

In a NETCONF-managed network, such as that shown in FIG. 1, virtual network slicing may be implemented using XSLT. An XSLT transformation is typically expressed as a file with the ".xslt" extension and encoded in XML. An XSLT transformation may be formulated programmatically, for example, within a computer program (e.g., a Java program) at run-time. Similarly, the transformation may be applied to an XML-encoded message or datastore at run-time. At least one example embodiment may utilize a javax.xml.transform package, and any Java Run-time Environment (JRE) that implements javax.xml.transform may be used. In the case of at least one example embodiment, OpenJDK 8 may be used.

Figure 2:
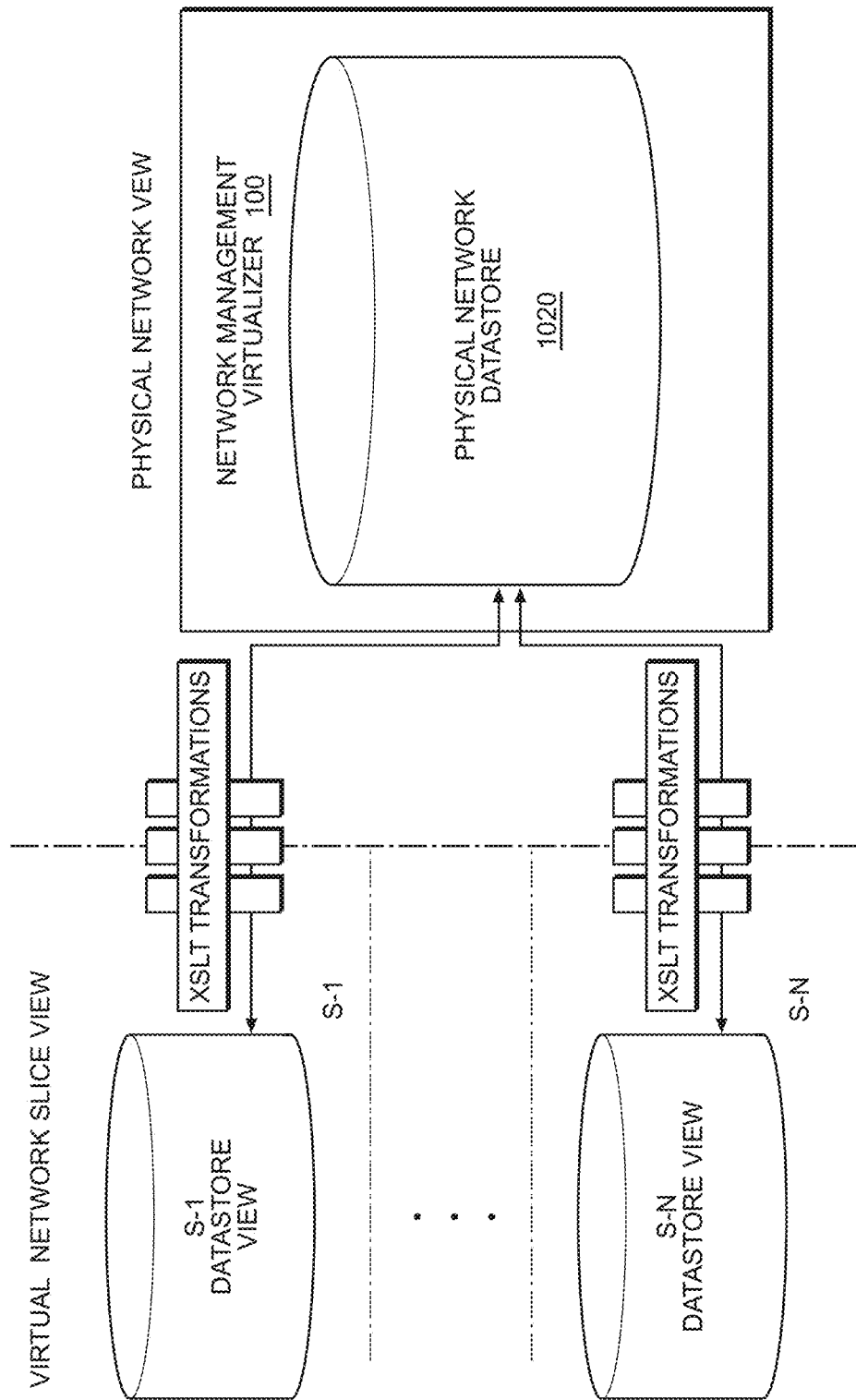
FIG. 2 is an embedded flow diagram illustrating a method according to one or more example embodiments.

FIG. 2 is an embedded flow diagram illustrating a method for providing virtual network slice views of the physical network datastore 1020 to slice owners of the plurality of virtual network slices S-1 through S-N in FIG. 1, according to one or more example embodiments. A virtual network slice view may also be referred to as a datastore virtual view.

The virtual network slice view for a virtual network slice is the virtual network slice view of the physical network datastore projected to the slice owner. The virtual network slice view may also be in the form of a user interface (e.g., graphical user interview (GUI)) that allows the slice owner (or owners) to view the entities, entity types, entity instances and configuration information assigned to the virtual network slice (or slices). In one example, the slice owner may access the virtual network slice view via a remote terminal. The virtual network slice view may be provided to the remote terminal by the network management virtualizer 100.

Referring to FIG. 2, XSLT transformations are applied to messages (e.g., NETCONF messages) to and from the network management virtualizer 100. The XSLT transformations filter or transform the messages such that the virtual network slice view provides only information that a particular slice owner is allowed to view.

According to at least one example embodiment, transformations may be optimized and cached for application to subsequent messages. A cached and optimized transformation may need to be replaced when either the related classification or allocation metadata is changed.

In this example, network configuration information is encoded in XML and stored in the physical network datastore 1020. Because the physical network datastore 1020 is encoded in XML, a single physical network datastore may be maintained for the entire physical network and the XML of the physical network datastore may be transformed based on a request from a slice owner for a given network slice to provide only network configuration information for the given network slice to the requesting slice owner. By transforming the physical network datastore XML on a per-request basis, a network slice view of the network may be provided to a slice owner without maintaining a separate physical network datastore for each virtual network slice. Accordingly, overhead and memory required to maintain and reconcile redundant data across multiple slices as well as the physical network data may be reduced.

According to one or more example embodiments, virtual network slicing may be implemented using unique tags, each of which uniquely identifies a virtual network slice. Within the physical network datastore 1020, physical data associated with a given virtual network slice is identified using the unique tag.

Tagging may be implemented in any manner depending on the nature of the physical network datastore and data encoding. As an example, in the NETCONF-managed network shown in FIG. 1, in which the physical network datastore 1020 is encoded in XML, unique tags may be implemented using prefixing or suffixing with data key values. A special character may be used to separate the prefix or suffix from the original key value.

Figure 3:
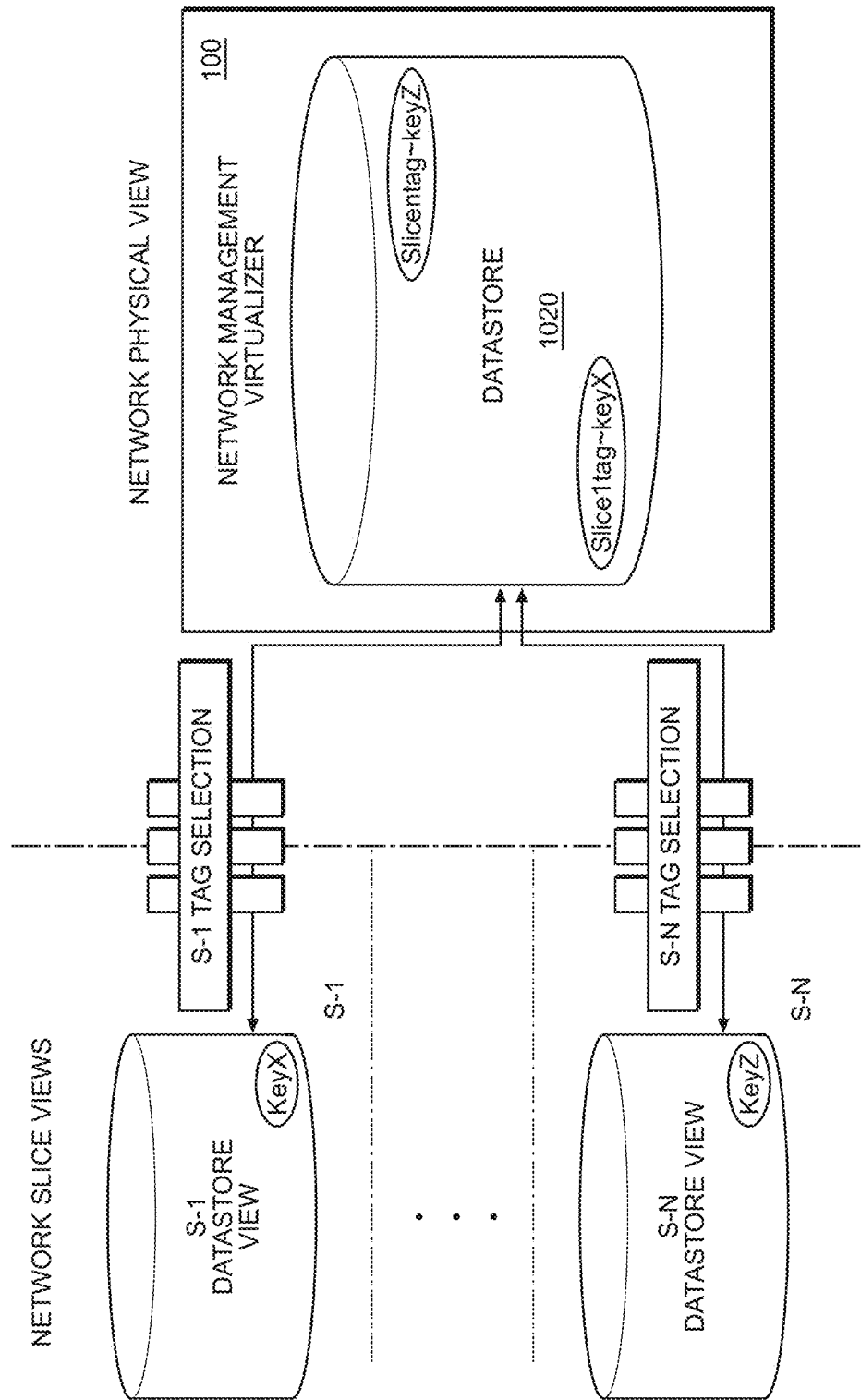
FIG. 3 is an embedded flow diagram illustrating another method according to one or more example embodiments.

FIG. 3 is an embedded flow diagram illustrating a method for implementing tagging (also referred to as pre-fixing) for virtual network slices S-1 through S-N, according to one or more example embodiments.

Referring to FIG. 3, the special character "~" is used as a separator such that a key tag for virtual network slice S-1 is 'Slice1tag~keyX', where the tag is 'Slice1tag' and the key is 'keyX'. In another example, a key tag for virtual network slice S-N is 'SliceNtag~keyZ', where the tag is 'SliceNtag' and the key is 'keyZ'. The network management virtualizer 100 may utilize XSLT transformations to filter or transform information from the physical network datastore 1020 to generate the virtual network slice view for the respective virtual network slices.

Key tags may be used to link network entities to a virtual network slice in the physical network datastore 1020. This enables the network management virtualizer 100 to differentiate between network entities created by a slice owner and the slice manager. This also distinguishes entities created by different slice owners.

Referring back to FIG. 1, because the physical network datastore 1020 and messages in the NETCONF-managed network shown in FIG. 1 are encoded in XML, the XML document of the single physical network datastore 1020 may be transformed based on a request from a slice owner such that a virtual network slice view of the physical network for only the virtual network slice managed by the requesting slice owner is provided without maintaining a separate physical network datastore for the individual virtual network slice. As mentioned above, this may suppress overhead or memory required to maintain or reconcile redundant data across multiple slices as well as the physical network data. Example embodiments may be applicable to any virtual network slicing of any NETCONF-managed network, as well as other network management protocols, datastore encoding and message encoding.

According to at least one example embodiment, the network management virtualizer 100 uses XSLT to filter access to the physical network datastore 1020 by a slice owner, thereby projecting a slice view of the physical network datastore to the slice owner, wherein the slice view includes only information associated with the virtual network slice associated with the slice owner. Thus, the slice view of the physical network datastore 1020 includes only a portion of the information stored in the physical network datastore 1020.

According to at least some example embodiments, the network management virtualizer 100 uses XSLT to transform and filter XML-encoded NETCONF requests from slice owners 110-S-1 through 110-S-N of virtual network slices S-1 through S-N, and to transform and filter XML-encoded network configuration information provided to the slice owners 110-S-1 through 110-S-N for virtual network slices S-1 through S-N.

According to at least one example embodiment, slice views may be defined at least in part by metadata for explicit allocation of network entity instances to each virtual network slice at runtime. Slice views may also be defined at least in part by metadata for the classification of entity types in the network model (e.g., YANG) for the physical network architecture.

According to at least one example embodiment, boundaries within the models of what is visible and modifiable by a slice owner in a virtual network slice may be defined utilizing metadata to classify entity types. In this regard, different entity types in the models may be classified based on their configurability in a given virtual network slice, and entity instances may be assigned to a virtual network slice according to their classification.

In one example, entity types may be classified as: visible, access-configurable, and create-able.

The visible classification denotes an entity type that is visible to the slice owner.

The access-configurable (or allocate-able) classification denotes an entity type that is read or read-write accessible by the slice owner. An entity type classified as access-configurable cannot be created by the slice owner, but the attributes of the entity type may be modified by the slice owner if read-write accessible. In this example, corresponding entity instances may also be created and assigned to a virtual network slice at run-time by the slice manager 110.

An entity type classified as create-able may be created by the slice owner. These entity types may be distinguished from entity types created by the slice manager 110 in the physical network datastore 1020 using tagging, which will be discussed in more detail later. In this example, corresponding entity instances may also be created and assigned to a virtual network slice at run-time by a slice owner or the slice manager 110.

Still referring to FIG. 1, the physical network datastore 1020 may store network configuration information for network entities. The network configuration information may include network entity classification metadata stored as a classification entry in the physical network datastore 1020. The network entity classification metadata may include: i) a unique identifier; and ii) model schema details required to identify the network entity or sets thereof in the network models including key definitions. In one example, model schema details refer to how the metadata expressions identify artifacts in the network management models (e.g., YANG). In this case, schema is used in a fashion similar to database schema, but referring to a device model artifact expressed in, for example, YANG for NETCONF or in a MIB for SNMP. Entity classification metadata will be discussed in more detail later with regard to FIG. 15.

Returning to FIG. 1, the slice manager 110 may explicitly assign instances of entity types (entity instances) to a given virtual network slice among the virtual network slices S-1 through S-N. In addition, the slice manager 110 may specify whether the entity instances are read-only or read-write accessible and/or specify limits (e.g., maximum number of entity instances) per virtual network slice. Metadata indicative of whether the entity instance is read-only or read-write accessible and limits per virtual network slice may be stored as part of the allocation metadata in the physical network datastore 1020.

The allocation metadata may also be part of the network configuration information, and may be stored in an allocation (or assignment) entry in the physical network datastore 1020. In one example, an allocation entry may include: i) the virtual network slice; ii) a unique identifier matching the classification entry being referred to; iii) a set of unique keys identifying the network entity instances in the allocation metadata; and iv) accessibility information (e.g., read-only or read-write) for the allocation metadata. Allocation metadata will be discussed in more detail later with regard to FIG. 16.

As mentioned above, one or more example embodiments may implement virtual network slicing using unique tags, wherein each unique tag uniquely identifies a virtual network slice. According to one or more example embodiments, network information (e.g., configuration information) for devices allocated to a given virtual network slice is identified using a key tag that is unique to the virtual network slice.

Figure 4:
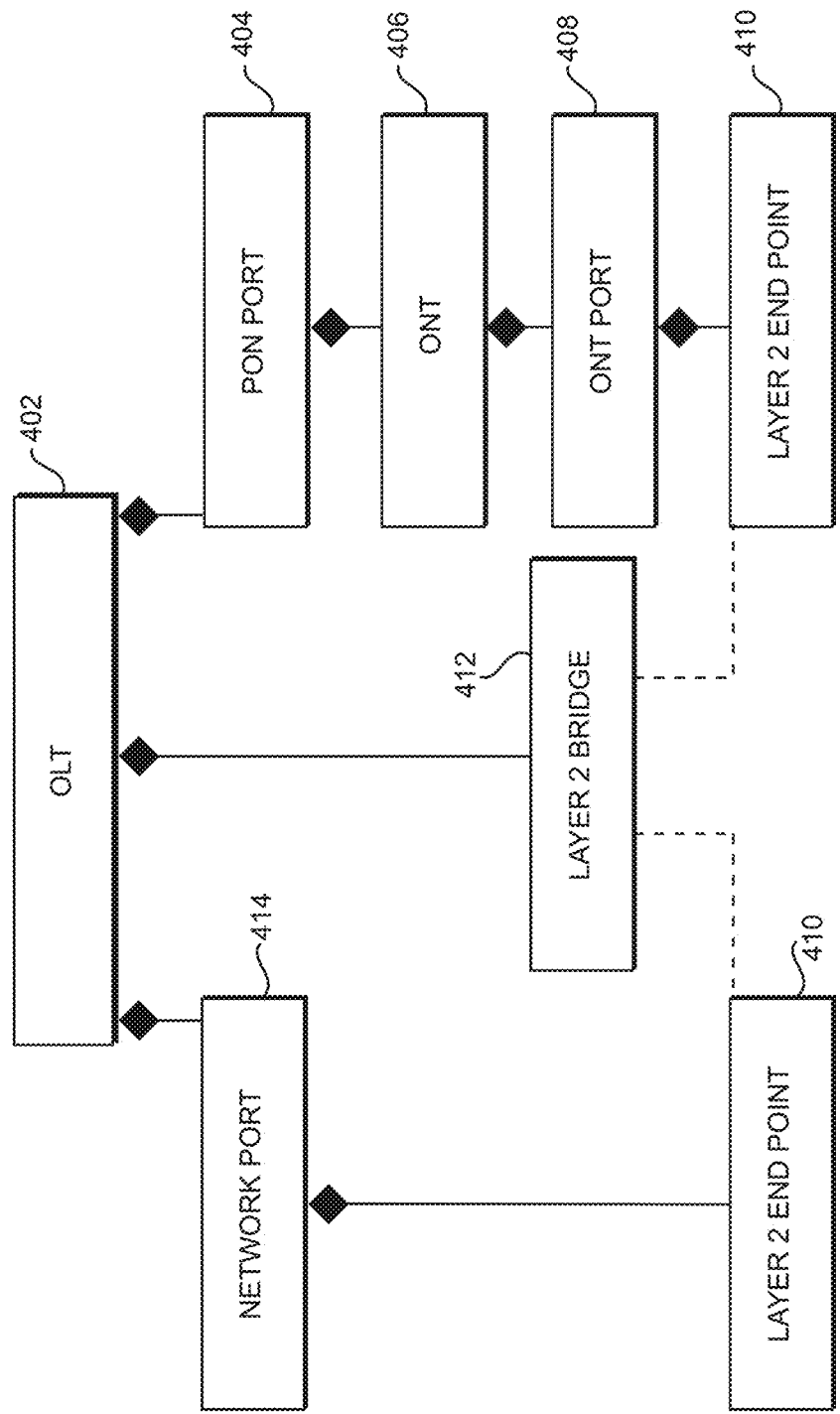
FIG. 4 illustrates an example data model for a passive optical network (PON) virtual network slice.

FIG. 4 illustrates an example data model for a passive optical network (PON) virtual network slice.

Referring to FIG. 4, each virtual network slice includes instances: Optical Line Terminal (OLT) 402, PON Port 404, Optical Network Terminal (ONT) 406, ONT Port 408, Layer 2 End Points 410, Layer 2 Bridge 412, and Network Port 414.

In this example, the data model includes an entity instance OLT 402, an entity instance Network Port 414, and four entity instances P1, P2, P3 and P4 for the PON Port Type.

Tables 1.1, 1.2 and 1.3 shown below illustrate a first configuration of the virtual network slice for slice owners blue and green of a virtual network slice.

TABLE 1.1

| Entity instances | Slicing model | Slice access configuration for slice owner 'blue' | Slice access configuration for slice owner 'green' |
| --- | --- | --- | --- |
| Network Port 414 | access Allocate-able | Read accessible | Read accessible |
| PON Port P1, P2, P3, P4 | access Allocate-able | Read accessible | Read accessible |

TABLE 1.2

| Entity Type Identifier | Slicing model | Datastore entries for slice owner 'blue' | Datastore entries for slice owner 'green' |
| --- | --- | --- | --- |
| ONT Type ID | Create-able by slice owners | ONT blue~406 | ONT green~406 |
| ONT Port Type ID | Create-able by slice owners | ONT Port blue~408 | ONT Port green~408 |
| Layer 2 Bridge Type ID | Create-able by slice owners | Layer 2 Bridge blue~412 | Layer 2 Bridge green~412 |
| Layer 2 End Point Type ID | Create-able by slice owners | Layer 2 End Point blue~410 | Layer 2 End Point green~410 |

TABLE 1.3

| Entity Type Identifier | Slicing model | Slice partition configuration for slice owner 'blue' | Slice partition configuration for slice owner 'green' |
| --- | --- | --- | --- |
| ONT Type ID | Create-able by slice owners | Limited to 100 | Limited to 200 |
| ONT Port Type ID | Create-able by slice owners | Unlimited | Unlimited |
| Layer 2 Bridge Type ID | Create-able by slice owners | Limited to 2 | Limited to 4 |
| Layer 2 End Point Type ID | Create-able by slice owners | Unlimited | Unlimited |

As shown in Table 1.1, instances Network Port 414 and PON Port 404 are read-only (viewable) to each slice owner. As show in Table 1.3, instances of the ONT Type, ONT Port Type, Layer 2 Bridge Type and Layer 2 End Points Type are each create-able by slice owners blue and green. However, instances of the ONT Type are limited to 100 instances for the slice owner blue and limited to 200 instances for slice owner green; instances of the Layer 2 Bridge Type are limited to two for the slice owner blue and limited to four instances for the slice owner green. Instances of the ONT Port Type and the Layer 2 End Points Type are unlimited for each of slice owners blue and green. Table 1.2 shows datastore entries for each slice owner.

Table 2 shown below illustrates a second configuration of the virtual network slice for slice owners blue and green of the virtual network slice.

TABLE 2

| Entity instances | Slicing model | Slice access configuration for slice owner 'blue' | Slice access configuration for slice owner 'green' |
| --- | --- | --- | --- |
| Network Port 414 | access Allocate-able | Read accessible | Read accessible |
| PON Port P1, P2 | access Allocate-able | Read and write accessible | |
| PON Port P3, P4 | access Allocate-able | | Read and write accessible |

As shown in Table 2, instance Network Port 414 is read-only to each, whereas specific instances of the PON Port Type are readable-writeable by respective slice owners. For example, the instances P1 and P2 of the PON Port Type are readable-writeable by the slice owner blue, whereas instances P3 and P4 of the PON Port Type are readable-writeable by the slice owner green.

Example operation of the network management virtualizer 100 will be described in more detail below. As mentioned above, for example purposes, the example operation will be discussed with regard to the NETCONF-managed network shown in FIG. 1. However, example embodiments should not be limited to this example.

FIGS. 5-7A are flow diagrams illustrating methods for providing network configuration and/or operational information in response to a query (or query message) from a slice owner and a slice manager, according to one or more example embodiments.

In FIGS. 5-7A, the flow diagrams are embedded in a portion of the physical network architecture shown in FIG. 1. As shown, the portion of the physical network architecture includes the slice owner 110-S-1, virtual network slice S-1, the slice manager 110, network management virtualizer 100 and the physical network datastore 1020. FIGS. 5-7A also illustrate the filtering interface between the network slice view seen by the slice owner 110-S-1 and the physical network view seen by the slice manager 110. FIGS. 5-7A will be discussed with regard to the NETCONF "GET" Remote Procedure Call (RPC). However, it should be understood that example embodiments are not limited to this example, but rather example embodiments are applicable to other NETCONF RPCs, such as the "GET-CONFIG" RPC.

Figure 5:
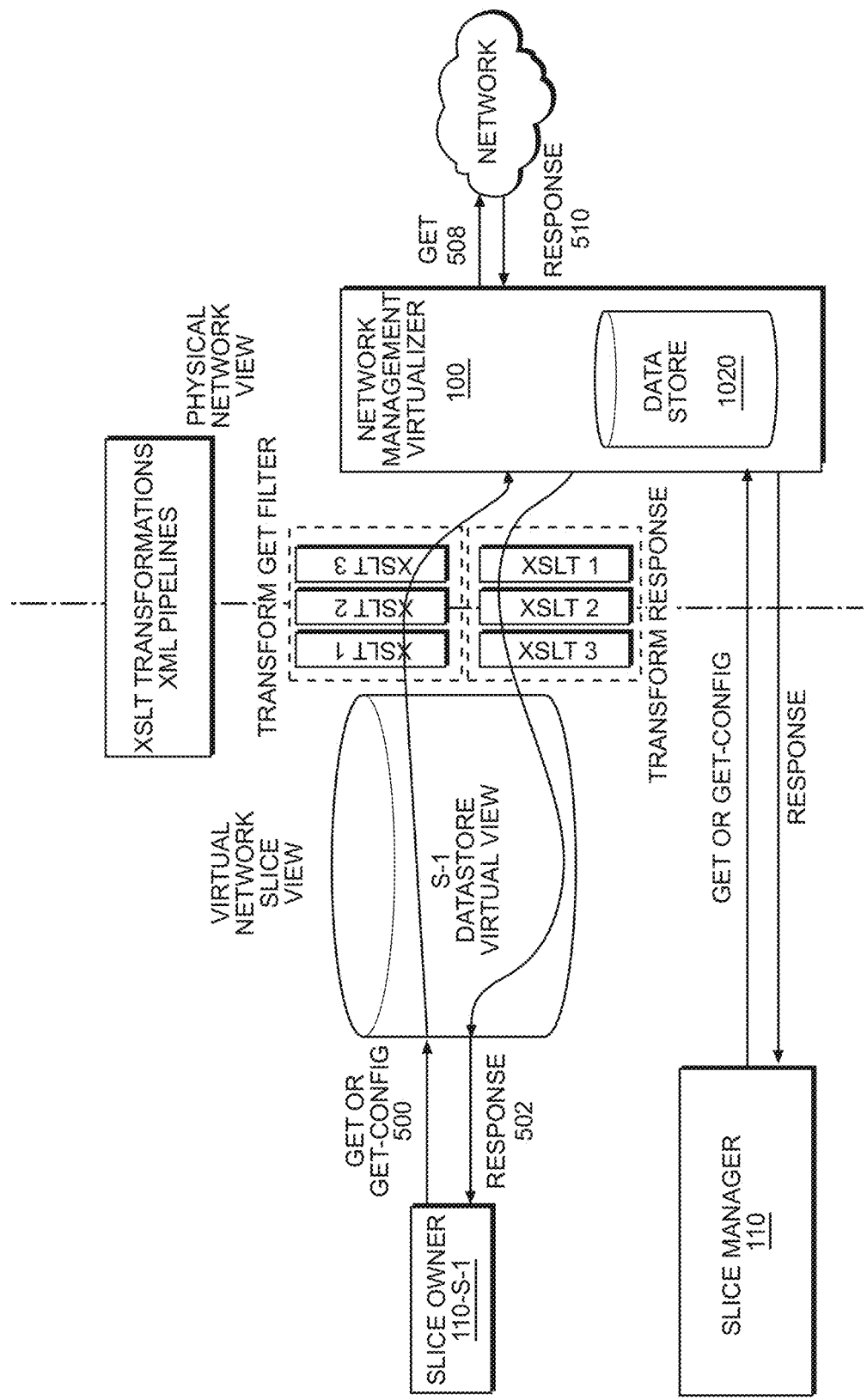
FIG. 5 is an embedded flow diagram illustrating a method according to one or more example embodiments.

Referring to FIG. 5, the slice owner 110-S-1 may request operational information for the physical network through the slice view by issuing a NETCONF GET RPC (500) to the network management virtualizer 100. The GET RPC may also be referred to as a query, query message or query filter.

The network management virtualizer 100 filters the GET RPC for the slice owner 110-S-1. The slice owner 110-S-1 may specify a filter that drives the content of the response output by the network management virtualizer 100 in response to the query. The network management virtualizer 100 filters or transforms (e.g., by applying XSLT transforms) the query from the virtual network slice view to the physical network view.

Figure 6:
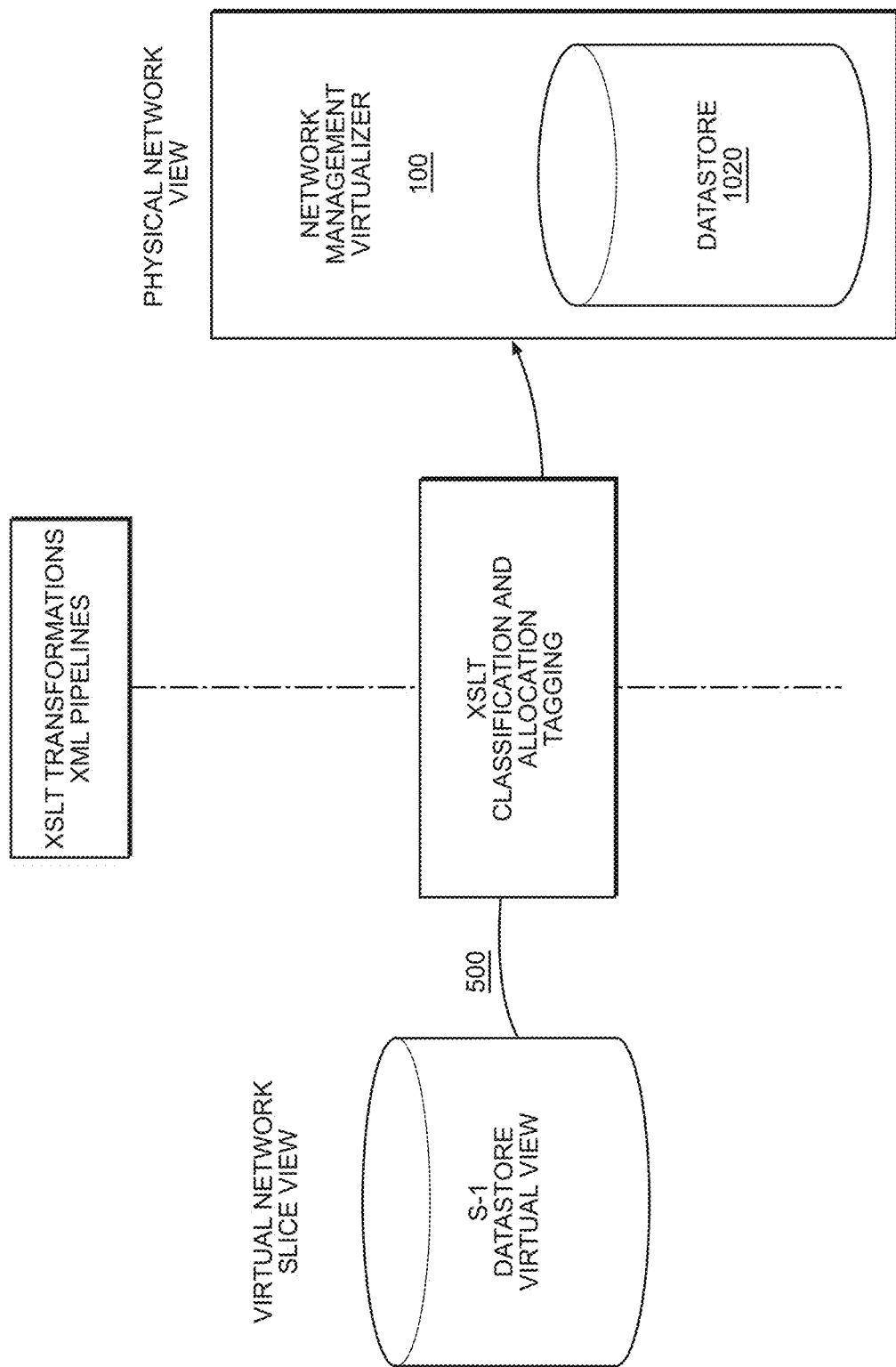
FIG. 6 is an embedded flow diagram illustrating a method according to one or more example embodiments.

FIG. 6 illustrates a portion of the embedded flow diagram shown in FIG. 5 in more detail.

Referring to FIG. 6, the GET RPC may be XSLT-transformed by adding key value tags based on classification and allocation metadata for the virtual network slice S-1. Allocation metadata may have priority in the sense that a network entity having associated metadata indicating that the network entity was created by the slice manager 110 and made visible in the virtual network slice S-1 is not tagged. Alternatively, if the classification metadata indicates that the network entity is classified as create-able within the virtual network slice S-1, then the network entity is tagged.

In the example shown in FIG. 6, the network management virtualizer 100 applies XSLT classification and allocation tagging to the GET RPC from the slice owner 110-S-1.

Returning to FIG. 5, in response to the GET RPC from the slice owner 110-S-1, the network management virtualizer 100 issues a GET RPC (508) to the devices in the network to obtain operational information for the network devices allocated to the virtual network slice S-1. In response to the GET RPC (508), the devices in the network provide operational information to the network management virtualizer 100 (510).

The network management virtualizer 100 then generates a NETCONF RESPONSE (502) to the slice owner 110-S-1. The RESPONSE may include a response data tree. The network management virtualizer 100 filters or transforms (e.g., XSLT-transforms) the RESPONSE from the physical network view to the virtual network slice view provided to the slice owner 110-S-1 and outputs the RESPONSE to the slice owner 110-S-1.

Still referring to FIG. 5, to request network configuration information for devices assigned to the virtual network slice S-1, the slice owner 110-S-1 may request network configuration information from the physical network datastore 1020 at the network management virtualizer 100 through the slice view by issuing a "GET-CONFIG" RPC to the network management virtualizer 100.

The "GET-CONFIG" RPC is filtered in the same or substantially the same manner as the GET RPC for the slice owner 110-S-1.

In response to the GET-CONFIG RPC from the slice owner 110-S-1, the network management virtualizer 100 obtains the network configuration information from the physical network datastore 1020 and generates a RESPONSE including the requested network configuration information. The network management virtualizer 100 filters or transforms the RESPONSE from the physical network view to provide the slice view to the slice owner 110-S-1 in the same or substantially the same manner as the GET RPC. Example filtering of the RESPONSE will be discussed in more detail below with regard to FIG. 7A.

Figure 7A:
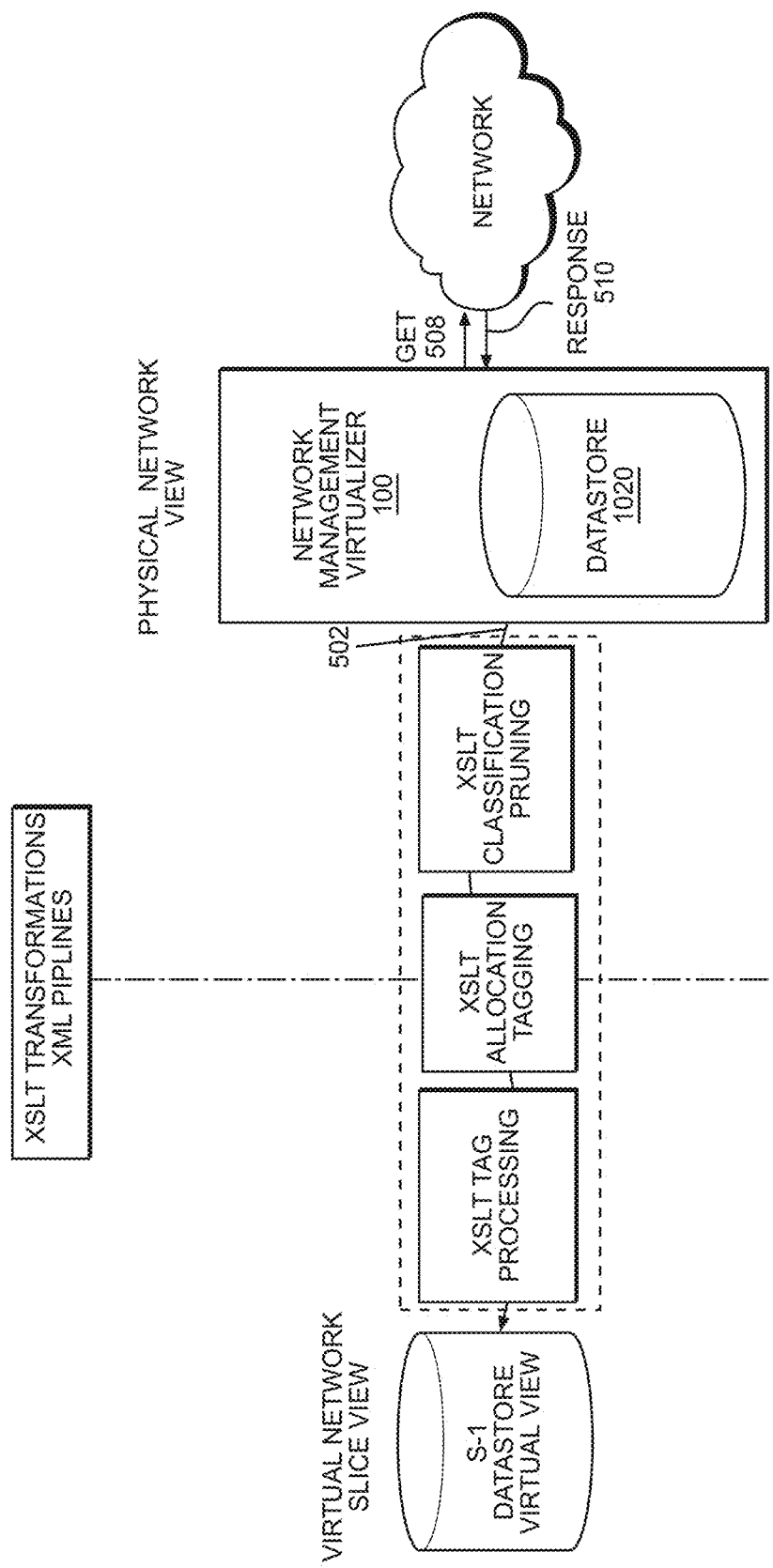
FIG. 7A is an embedded flow diagram illustrating a method according to one or more example embodiments.

FIG. 7A illustrates a portion of the embedded flow diagram shown in FIG. 5 in more detail. In the example embodiment shown in FIG. 7A, the network management virtualizer 100 XSLT-transforms the RESPONSE using an XML pipeline of three XSLT transformations. As mentioned above, the RESPONSE may include a response data tree. The example embodiment shown in FIG. 7A will be described with regard to a response data tree for example purposes.

As shown in FIG. 7A, the response data tree is first pruned according to the entity type classification metadata (XSLT classification pruning). The response data tree is then pruned according to the entity instance allocation metadata (XSLT allocation tagging). The virtual network slice tags are then processed by being removed from the entity key values that are tagged (XSLT tag processing). The transformed RESPONSE is then provided to the slice owner 110-S-1. Example embodiments of XSLT classification pruning, XSLT allocation tagging and XSLT tag processing will be discussed in more detail below with regard to FIGS. 7B-7D.

The slice manager 110 may issue queries (e.g., GET or GET-CONFIG RPCs) to, and receive query responses (e.g., RESPONSEs) from, the network management virtualizer 100 in the same or substantially the same manner as the slice owner 110-S-1. However, the queries from, and query responses to, the slice manager 110 need not be filtered or transformed as discussed above with regard to the slice owner 110-S-1.

Figure 7B:
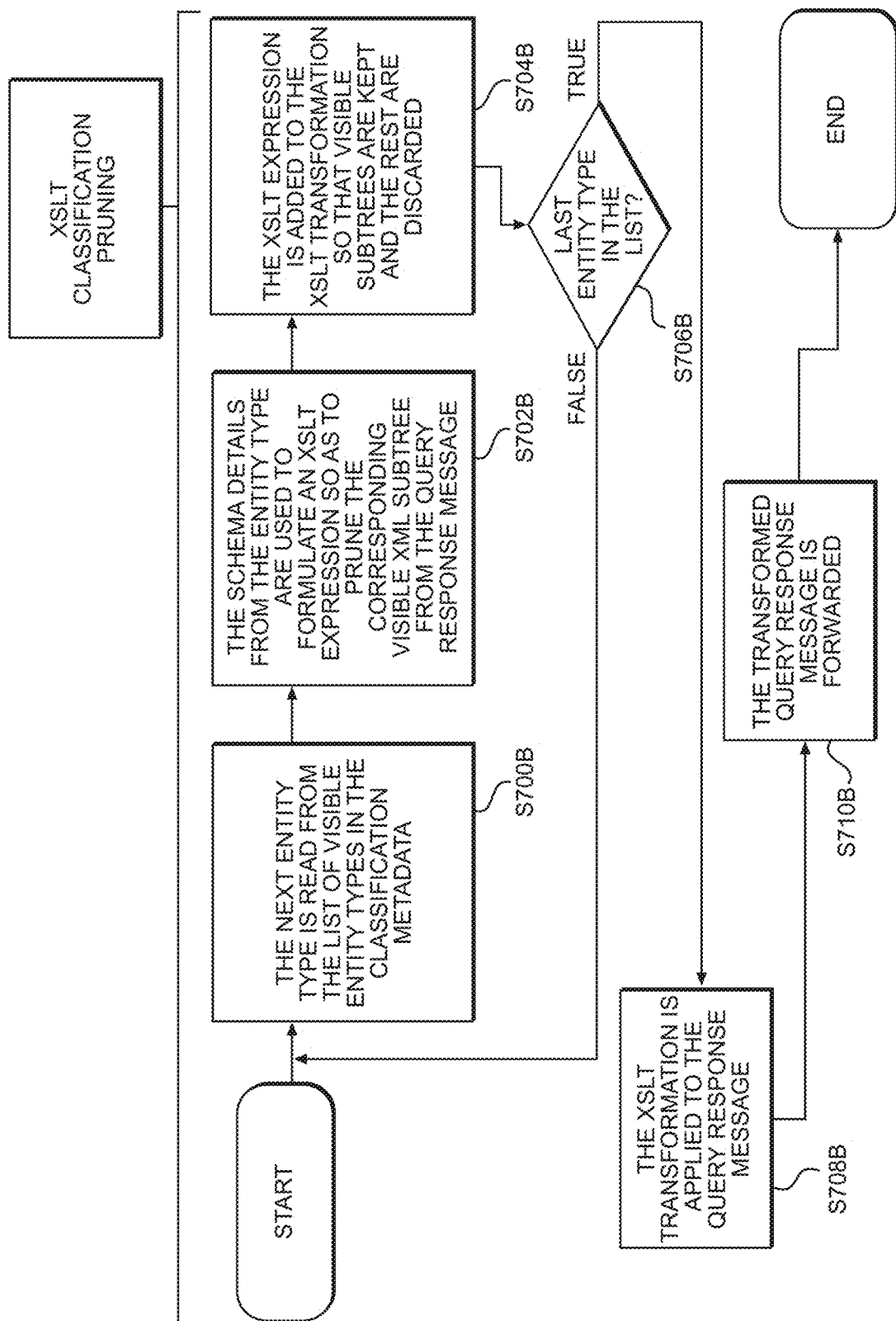
FIG. 7B is a flow chart illustrating a method according to one or more example embodiments.

FIG. 7B is a flow chart illustrating a method for XSLT classification pruning according to one or more example embodiments. In describing the example embodiment shown in FIG. 7B, the RESPONSE message will be referred to more generically as a query response or query response message.

Referring to FIG. 7B, at step S700B the network management virtualizer 100 reads a next entity type (the current entity type) from a list of visible network entity types in the classification metadata for the virtual network slice S-1 stored at the physical network datastore 1020.

At step S702B, the network management virtualizer 100 uses schema details for the current entity type in the classification metadata to formulate an XSLT expression to prune the corresponding visible XML subtree(s) in the query response message. As mentioned above, schema details refer to how the metadata expressions identify artifacts in the network management models (e.g., YANG).

At step S704B, the network management virtualizer 100 adds the XSLT expression to the XSLT transformation so that the visible XML subtree(s) corresponding to the current entity type are kept, and the rest are discarded, when the XSLT transformation is applied to the query response message.

At step S706B, the network management virtualizer 100 determines whether the current entity type is the last entity type in the list of visible entity types.

If the current entity type is not the last entity type in the list of visible entity types, then the process returns to step S700B and continues as discussed herein for the next entity type in the list of visible entity types in the classification metadata for the virtual network slice S-1.

Returning to step S706B, if the current entity type is the last entity type in the list of visible entity types in the virtual network slice S-1, then the network management virtualizer 100 applies the XSLT transformation to the query response message at step S708B.

At step S710B, the network management virtualizer 100 then forwards transformed query response message for XSLT allocation tagging.

Figure 7C:
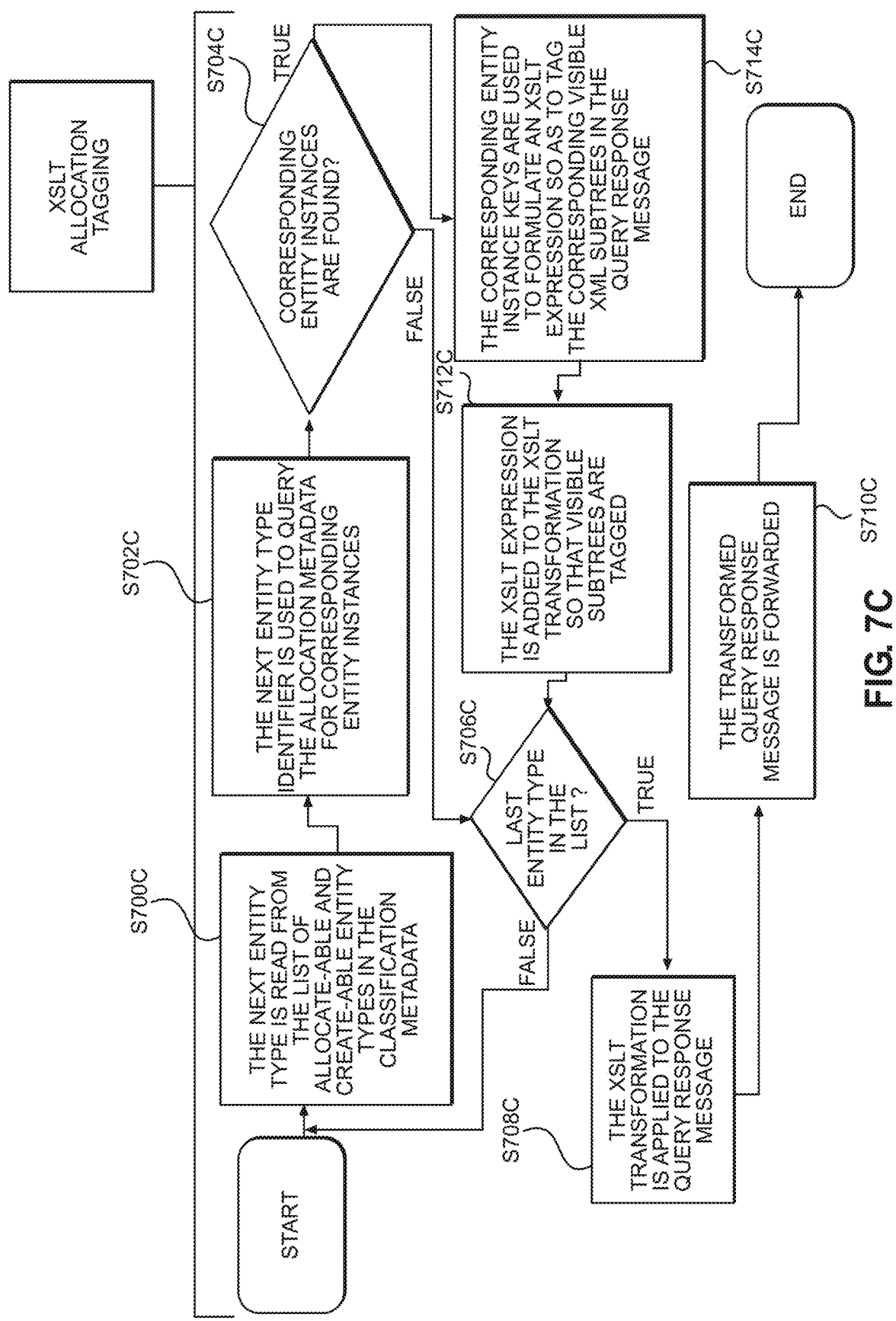
FIG. 7C is a flow chart illustrating a method according to one or more example embodiments.

FIG. 7C is a flow chart illustrating a method for XSLT allocation tagging according to one or more example embodiments. In describing the example embodiment shown in FIG. 7C, the RESPONSE message will again be referred to more generically as a query response or query response message.

Referring to FIG. 7C, at step S700C the network management virtualizer 100 reads a next entity type (current entity type) from the list of allocate-able and create-able entity types in the classification metadata for the virtual network slice S-1.

According to at least one example embodiment, the list of allocate-able and create-able entity types is a merged list including slice entity types in a deviceSlicingAccessConfigurables list and slice entity types in a deviceSlicingCreateables list. The deviceSlicingAccessConfigurables list includes slice entity types created by the slice manager 110 and shared among the slice owners 110-S-1 through 110-S-N. The deviceSlicingCreateables list includes a list of slice entity types created by the slice owners 110-S-1 through 110-S-N or created by the slice manager 110 and shared among slice owners 110-S-1 through 110-S-N. According to at least one example embodiment, the same entity type may not show up in both the deviceSlicingCreateables list and the deviceSlicingAccessConfigurables list.

At step S702C, the network management virtualizer 100 queries the allocation metadata for corresponding instances of the current entity type from the physical network datastore 1020 based on the slice entity type identifier for the current entity type in the classification metadata.

If the network management virtualizer 100 finds instances of the current entity type in the allocation metadata, then at step S714C the network management virtualizer 100 formulates an XSLT expression to tag the corresponding visible XML subtrees in the query response message based on the keys for the instances of the current entity type found at step S704C.

At step S712C, the network management virtualizer 100 adds the XSLT expression to the XSLT transformation to tag the visible XML subtrees when the XSLT transformation is applied to the query response message.

The network management virtualizer 100 then determines whether the current entity type is the last entity type in the list of allocate-able and create-able entity types at step S706C.

If the network management virtualizer 100 determines that the current entity type is not the last entity type in the list of allocate-able and create-able entity types at step S706C, then the process returns to step S700C and continues as discussed herein for the next entity type in the list of allocate-able and create-able entity types.

Returning to step S706C, if the network management virtualizer 100 determines that the current entity type is the last entity type in the list of allocate-able and create-able entity types, then at step S708C the network management virtualizer 100 applies the XSLT transformation to the response query message. At step S710C, the network management virtualizer 100 then forwards the transformed response query message for further processing.

Returning to step S704C, if the network management virtualizer 100 does not find corresponding instance of the current entity type in the allocation metadata, the process then proceeds to step S706C and continues as discussed above.

Figure 7D:
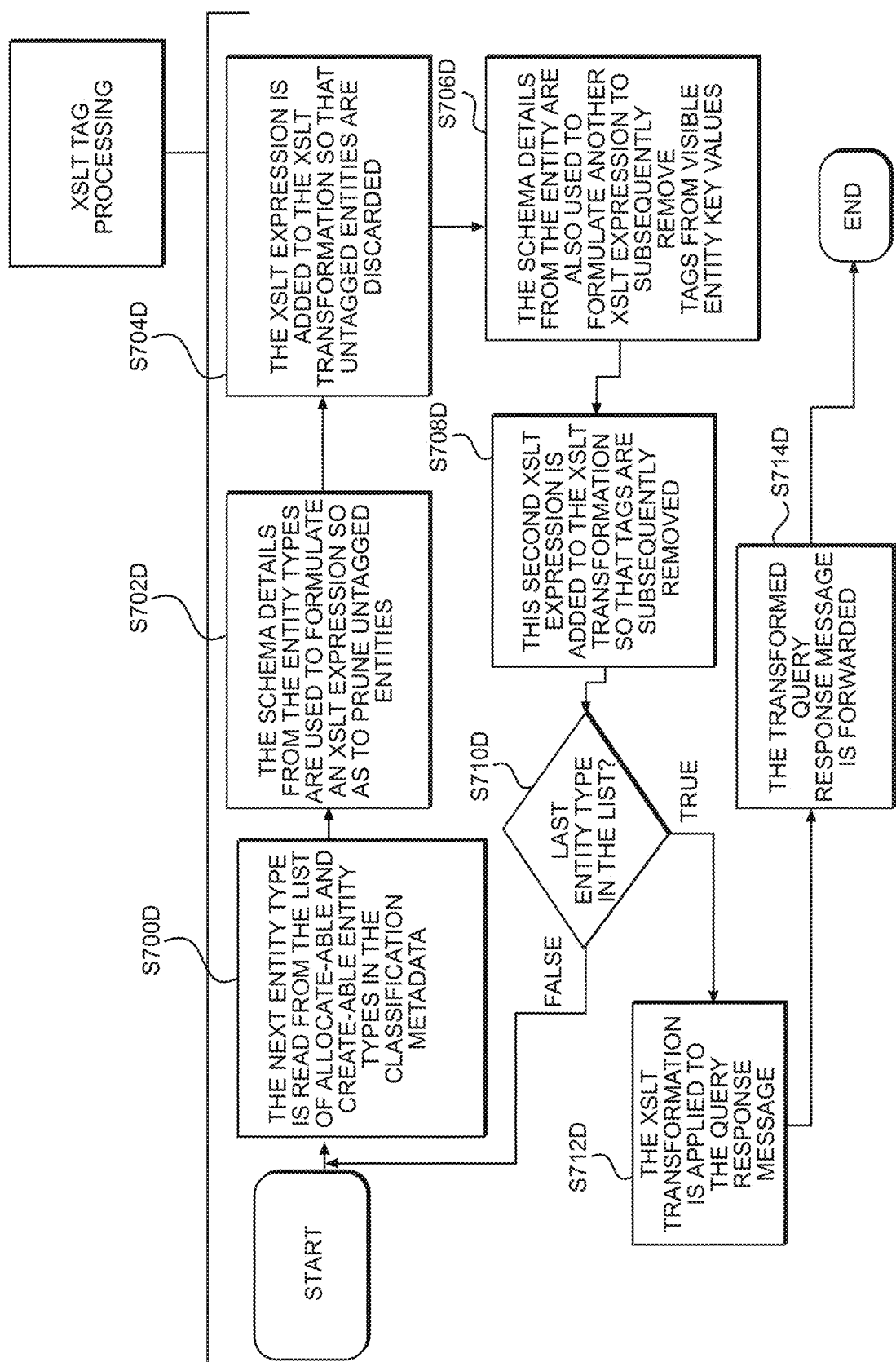
FIG. 7D is a flow chart illustrating a method according to one or more example embodiments.

FIG. 7D is a flow chart illustrating a method for XSLT tag processing, according to one or more example embodiments. In describing the example embodiment shown in FIG. 7D, the RESPONSE message will again be referred to more generically as a query response or query response message.

Referring to FIG. 7D, similar to step S700C in FIG. 7C, at step S700D the network management virtualizer 100 again reads the next entity type from the list of allocate-able and create-able entity types in the classification metadata for the virtual network slice S-1.

At step S702D, the network management virtualizer 100 formulates an XSLT expression to remove untagged entities from the query response message based on the schema details for the current entity type in the classification metadata.

At step S704D, the network management virtualizer 100 adds the XSLT expression to the XSLT transformation so that untagged entities are discarded from the query response message when the XSLT transformation is applied to the query response message.

At step S706D, the network management virtualizer 100 formulates another XSLT expression to subsequently remove tags from key values for the tagged entities based on the schema details for the current entity type in the classification metadata.

At step S708D, the network management virtualizer 100 adds the XSLT expression formulated at 5706D to the XSLT transformation to remove the tags added in accordance with the XSLT allocation tagging discussed above with regard to FIG. 7C when the XSLT transformation is applied to the query response message.

At step S710D, the network management virtualizer 100 determines whether the current entity type is the last entity type in the list of allocate-able and create-able entity types.

If the current entity type is not the last entity type in the list of allocate-able and create-able entity types, then the process returns to step S700D and the network management virtualizer 100 performs another iteration of the process for the next entity type in the list of allocate-able and create-able entity types.

Returning to step S710D, if the current entity type is the last entity type in the list of allocate-able and create-able entity types, then the network management virtualizer 100 applies the XSLT transformation to the query response message at step S712D, and forwards the transformed query response message to the slice owner 110-S-1 at step S714D. In forwarding the transformed query response message to the slice owner 110-S-1, the network management virtualizer 100 provides only information associated with the virtual network slice S-1 to the slice owner 110-S-1 without the need to replicate data across multiple physical network datastores for multiple virtual network slices.

Figure 8:
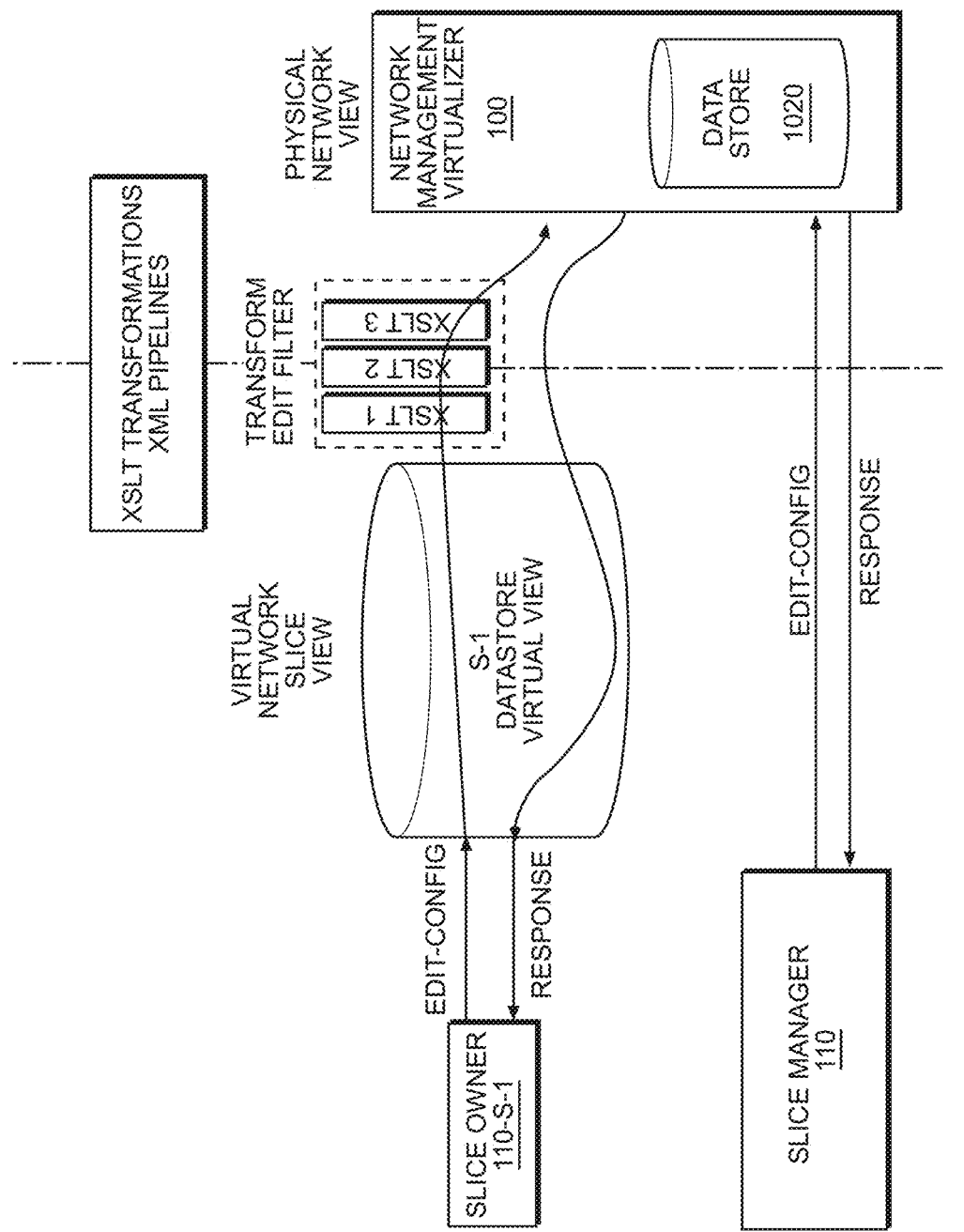
FIG. 8 is an embedded flow diagram illustrating a method according to one or more example embodiments.
Figure 9A:
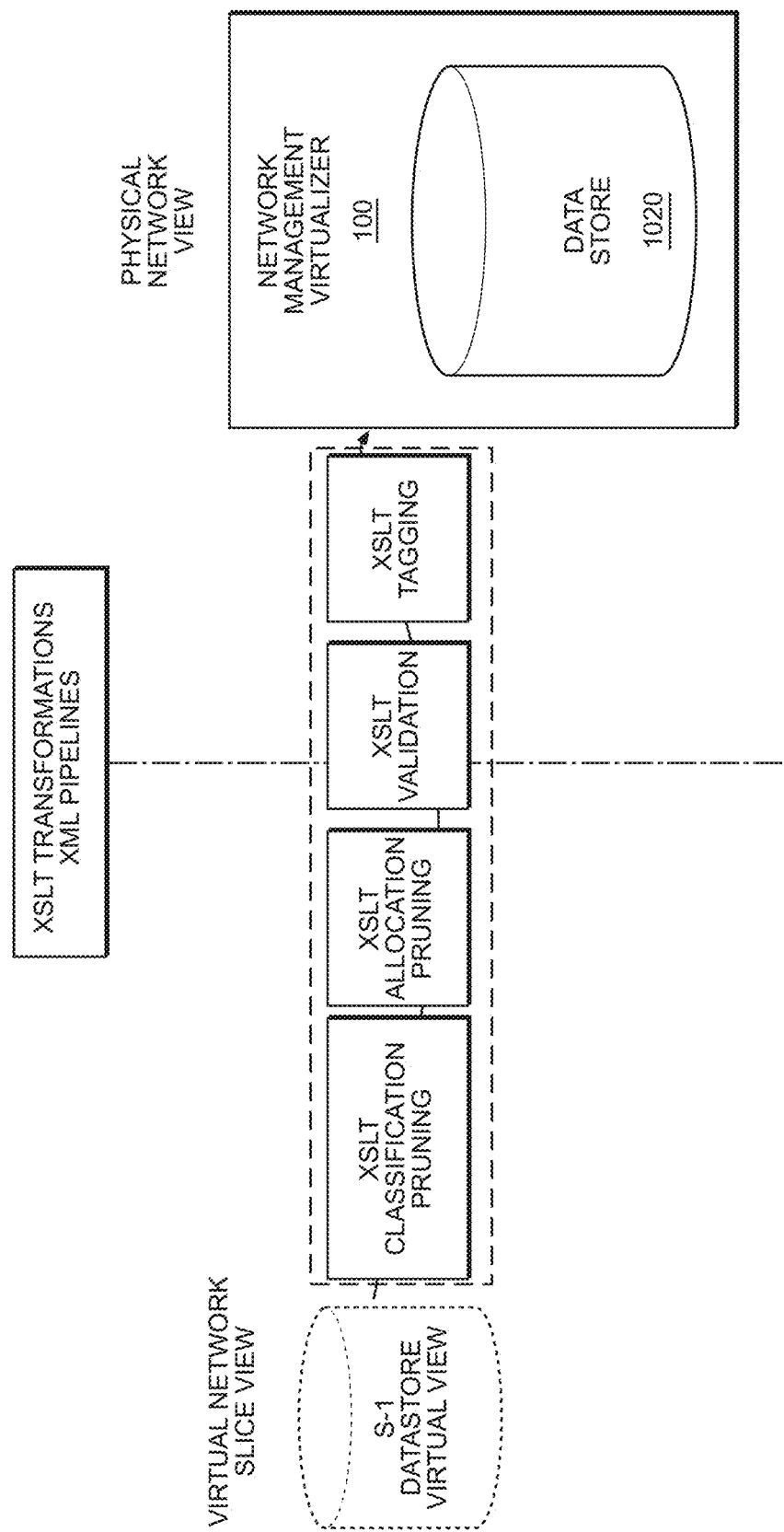
FIG. 9A is an embedded flow diagram illustrating a method according to one or more example embodiments.

FIGS. 8 and 9A are flow diagrams illustrating methods for configuring a virtual network slice according to one or more example embodiments.

In the FIGS. 8 and 9A, the flow diagrams are embedded in a portion of the physical network architecture of FIG. 1 including the slice owner 110-S-1 of virtual network slice S-1, the slice manager 110, the network management virtualizer 100 and the physical network datastore 1020. FIGS. 8 and 9A also illustrate the filtering interface between the virtual network slice view seen by the slice owner 110-S-1 and the physical network view seen by the slice manager 110.

The slice owner 110-S-1 or the slice manager 110 may configure the virtual network slice S-1 using an EDIT-CONFIG RPC. As shown in FIG. 8, the network management virtualizer 100 filters or transforms (e.g., XSLT transforms) the EDIT-CONFIG RPC from the slice owner 110-S-1 before executing the RPC and applying the EDIT-CONFIG to the physical network datastore 1020. By contrast, the network management virtualizer 100 applies the EDIT-CONFIG RPC from the slice manager 110 directly to the physical network datastore 1020 without filtering or transformation.

Referring to FIG. 9A, the network management virtualizer 100 filters or transforms the EDIT-CONFIG RPC from the slice owner 110-S-1 by: 1) pruning the EDIT-CONFIG RPC from the slice owner 110-S-1 to validate that the EDIT-CONFIG RPC is not requesting modification of any network entities that are not classified as either create-able or allocate-able (XSLT classification pruning) in the classification metadata for the virtual network slice S-1; 2) pruning the EDIT-CONFIG RPC to validate that the EDIT-CONFIG RPC is not requesting modification of any network entities that are not allocated as read-write for the virtual network slice S-1 (XSLT allocation pruning); 3) validating the EDIT-CONFIG RPC to ensure that any other network slicing constraints are met (XSLT validation); and 4) tagging the EDIT-CONFIG RPC for any create-able entity types that are not allocated instances for read-write access (XSLT tagging). Example embodiments of XSLT classification pruning, XSLT allocation pruning, XSLT validation and XSLT tagging will be discussed in more detail below with regard to FIGS. 9B-9D.

Figure 9B:
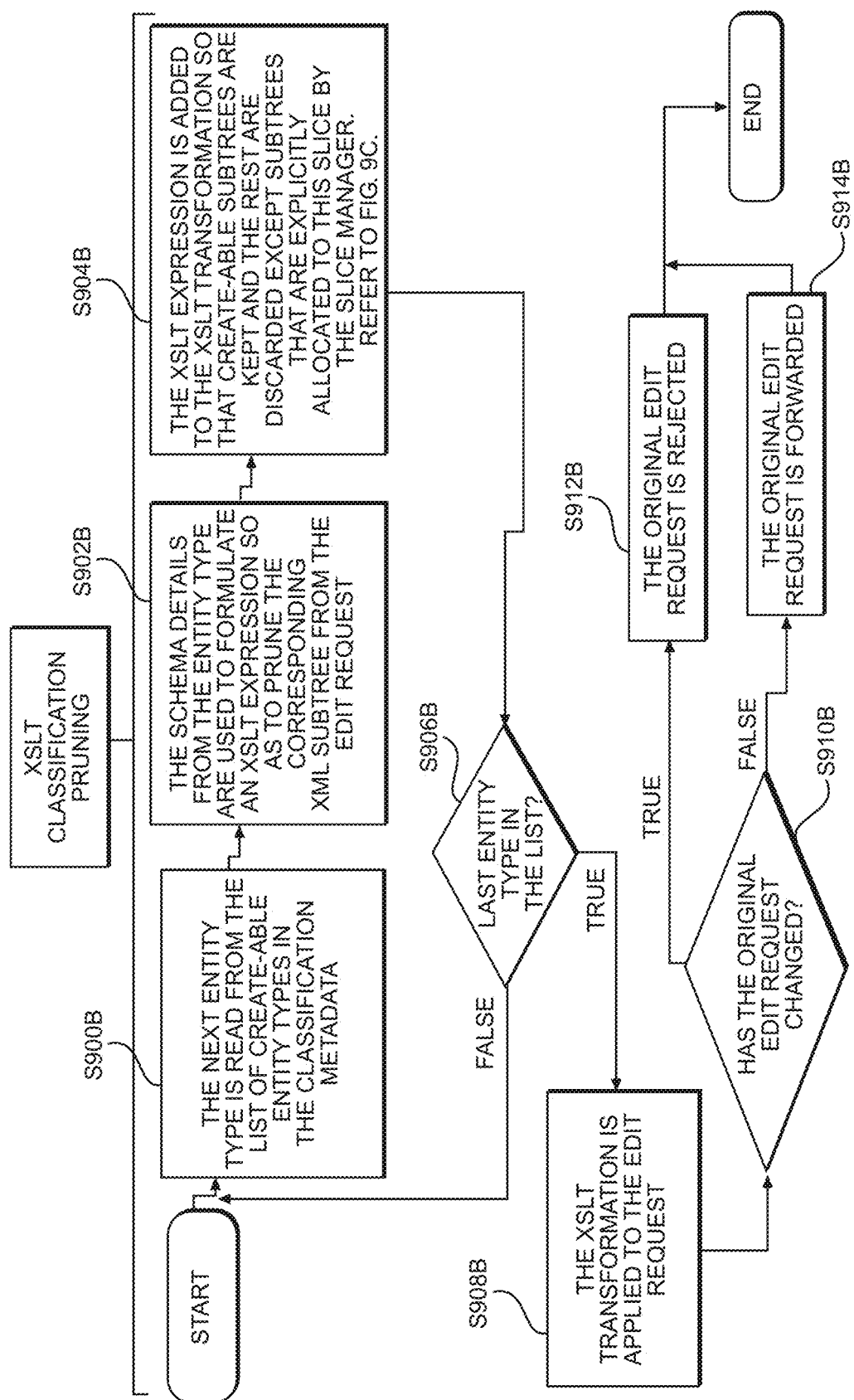
FIG. 9B is a flow chart illustrating a method according to one or more example embodiments.

FIG. 9B is a flow chart illustrating an example embodiment of the XSLT classification pruning shown in FIG. 9A. In discussing FIG. 9B, the EDIT-CONFIG RPC is referred to more generically as an edit request.

Referring to FIG. 9B, at step S900B the network management virtualizer 100 reads the next entity type from the list of create-able entity types in the classification metadata for the virtual network slice S-1.

At step S902B, the network management virtualizer 100 formulates an XSLT expression to prune the corresponding visible XML subtree(s) in the edit request based on the schema details for the current entity type in the classification metadata. The network management virtualizer 100 may formulate the XSLT expression in the same or substantially the same manner as discussed above with regard to step S702B in FIG. 7B.

At step S904B, the network management virtualizer 100 adds the XSLT expression to the XSLT transformation so that the create-able XML subtree(s) corresponding to the current entity type are kept and the rest are discarded when the XSLT transformation is applied to the edit request.

At step S906B, the network management virtualizer 100 determines whether the current entity type is the last entity type in the list of create-able entity types in the classification metadata.

If the current entity type is not the last entity type in the list of create-able entity types in the classification metadata, then the process returns to step S900B and the network management virtualizer 100 performs another iteration for the next entity type in the list of create-able entity types in the classification metadata.

Returning to step S906B, if the current entity type is the last entity type in the list of create-able entity types in the classification metadata, then the network management virtualizer 100 applies the XSLT transformation to the edit request at step S908B.

At step S910B, the network management virtualizer 100 determines whether the edit request has changed as a result of the application of the XSLT transformation. With regard to XML and XML documents, for example, the network management virtualizer 100 may determine whether the edit request has changed by comparing the original edit request with the transformed edit request after application of the XSLT transformation at run-time (e.g., in a computer program such as Java). According to at least one example embodiment, the network management virtualizer 100 may compare the original edit request with the transformed edit request by utilizing a library compareXML method. However, other methodologies may also be used. According to at least one other example embodiment, more complex XSLT in which validation over-and-above transforming the original XML message may also be used.

If the network management virtualizer 100 determines that the original edit request is the same as the transformed edit request (the transformation did not change the edit request), then at step S914B the network management virtualizer 100 forwards the original edit request for XLST allocation pruning.

Returning to step S910B, if the original edit request has changed as a result of the XSLT transformation at step S908B, then the network management virtualizer 100 rejects the edit request from the slice owner 110-S-1 at step S912B. According to at least one example embodiment, if the network management virtualizer 100 rejects the edit request, then the network management virtualizer 100 does not apply the requested changes and outputs an error-report.

FIG. 9C is a flow chart illustrating an example embodiment of the XSLT allocation pruning shown in FIG. 9A. In discussing FIG. 9C, the "EDIT-CONFIG" RPC is again referred to more generically as an edit request.

Referring to FIG. 9C, at step S900C the network management virtualizer 100 reads the next entity type from the list of allocate-able and create-able entity types in the classification metadata for the virtual network slice S-1.

At step S902C, the network management virtualizer 100 queries allocation metadata for corresponding instances of the current entity type from the physical network datastore 1020 based on the entity type identifier for the current entity type in the classification metadata.

If the network management virtualizer 100 finds instances of the current entity type as a result of the query of the allocation metadata at S904C, then at step S918C the network management virtualizer 100 uses the entity instance keys to formulate an XSLT expression to match the corresponding allocated XML instances of the current entity type in the edit request.

At step S906C, the network management virtualizer 100 adds the XSLT expression to the XSLT transformation so that unallocated instances, or allocated but not read-write accessible instances, are pruned from the edit request when the XSLT transformation is applied to the edit request.

At step S908C, the network management virtualizer 100 determines whether the current entity type is the last entity type in the list of allocate-able and create-able entity types.

If the network management virtualizer 100 determines that the current entity type is not the last entity type in the list of allocate-able and create-able entity types at step S908C, then the process returns to step S900C and the network management virtualizer 100 performs another iteration for the next entity type in the list of allocate-able and create-able entity types.

Returning to step S908C, if the current entity type is the last entity type in the list of allocate-able and create-able entity types, then at step S910C the network management virtualizer 100 applies the XSLT transformation to the edit request.

At step S912C, the network management virtualizer 100 determines whether the original edit request has changed as a result of the application of the XSLT transformation. The network management virtualizer 100 may determine whether the original edit request has changed in the same or substantially the same manner as discussed above with regard to step S910B in FIG. 9B.

If the edit request has not changed as a result of the application of the XSLT transformation, then at step S914C the network management virtualizer 100 forwards the original edit request for XSLT validation.

Returning to step S912C, if the original edit request has changed as a result of the application of the XSLT transformation, then at step S916C the network management virtualizer 100 rejects the original edit request.

Returning now to step S904C, if the network management virtualizer 100 does not find any corresponding instances of the current entity type as a result of the query at step S902C, then the process proceeds to step S908C and continues as discussed herein.

Figure 9D:
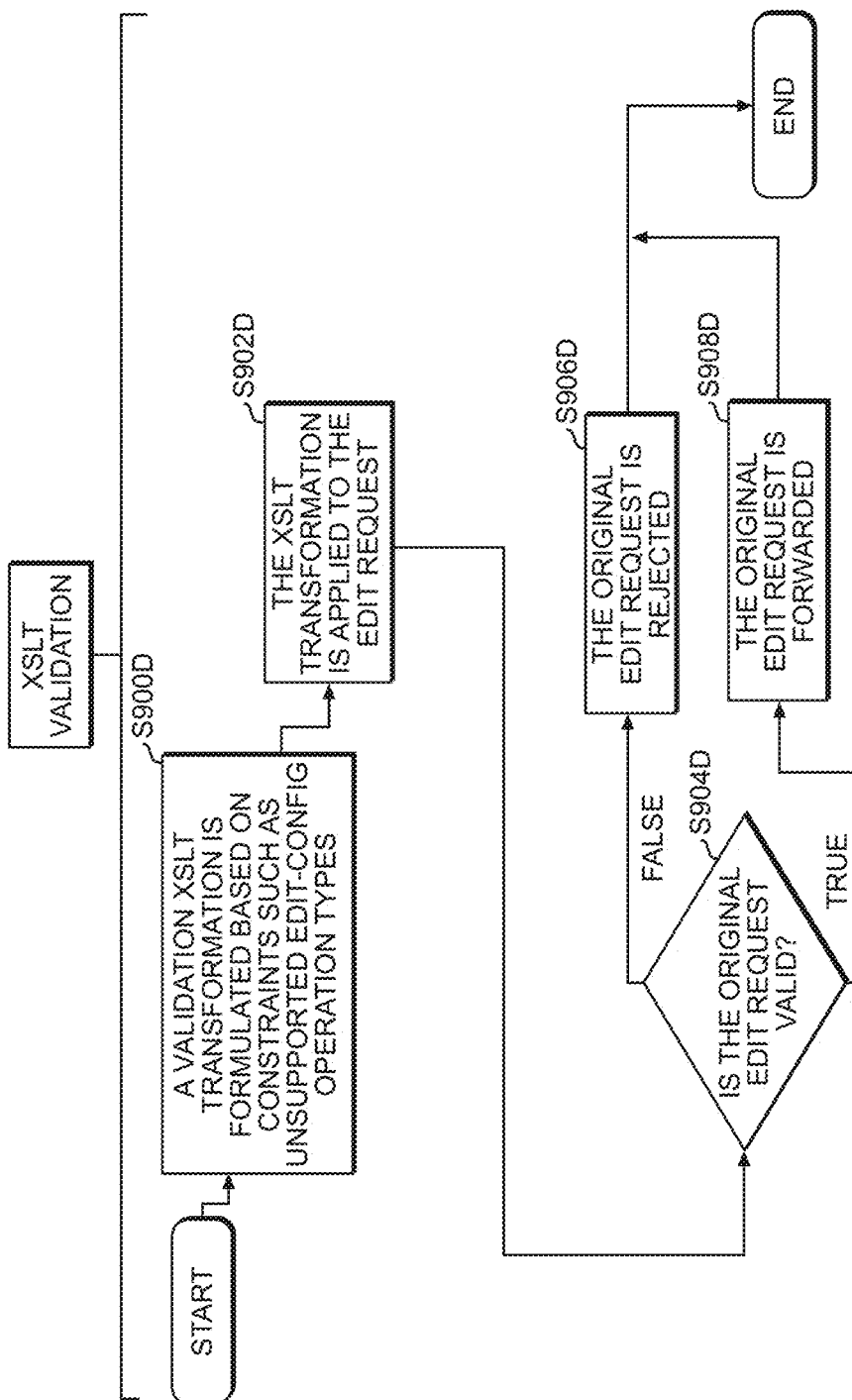
FIG. 9D is a flow chart illustrating a method according to one or more example embodiments.

FIG. 9D is a flow chart illustrating an example embodiment of the XSLT validation shown in FIG. 9A. In discussing FIG. 9D, the NETCONF "EDIT-CONFIG" RPC is again referred to more generically as an edit request.

Referring to FIG. 9D, at step S900D the network management virtualizer 100 formulates a XSLT validation transformation based on constraints for the edit request. According to at least some example embodiments, constraints may include unsupported RPC operation types (e.g., a REPLACE or other operation that is not supported). Thus, in at least one example embodiment, the network management virtualizer 100 generates an XSLT validation transformation, which is a coding function, to remove unsupported operation types, types of datastores, etc., from the edit request.

At step S902D, the network management virtualizer 100 applies the XSLT validation transformation to the edit request to generate a transformed edit request. In the transformed edit request, if the edit request included an unsupported RPC operation type, then the unsupported RPC operation type may be pruned from the edit request to generate the transformed edit request.

At step S904D, the network management virtualizer 100 determines whether the original edit request is valid. In one example, the network management virtualizer 100 determines that the original edit request is valid if the transformed edit request is the same as the original edit request (the edit request does not change as a result of the application of the XSLT transformation at step S902D).

If the network management virtualizer 100 determines that the original edit request is valid (has not changed), then at step S908D the network management virtualizer 100 forwards the edit request for XSLT tagging.

Returning to step S904D, if the network management virtualizer 100 determines that the original edit request is not valid (has changed as a result of the applied XSLT transformation), then at step S906D the network management virtualizer 100 rejects the edit request.

In an alternative to the example embodiment shown in FIG. 9D, the XSLT transformation may return a true or false after checking for the presence of unsupported RPC operations. In this case, the network management virtualizer 100 may simply check the return value of the XSLT transformation, true or false, so as to validate the EDIT-CONFIG request. In yet another alternative, the unsupported RPC operations may be configurable, instead of being hard-coded in the logic of the source code.

Figure 9E:
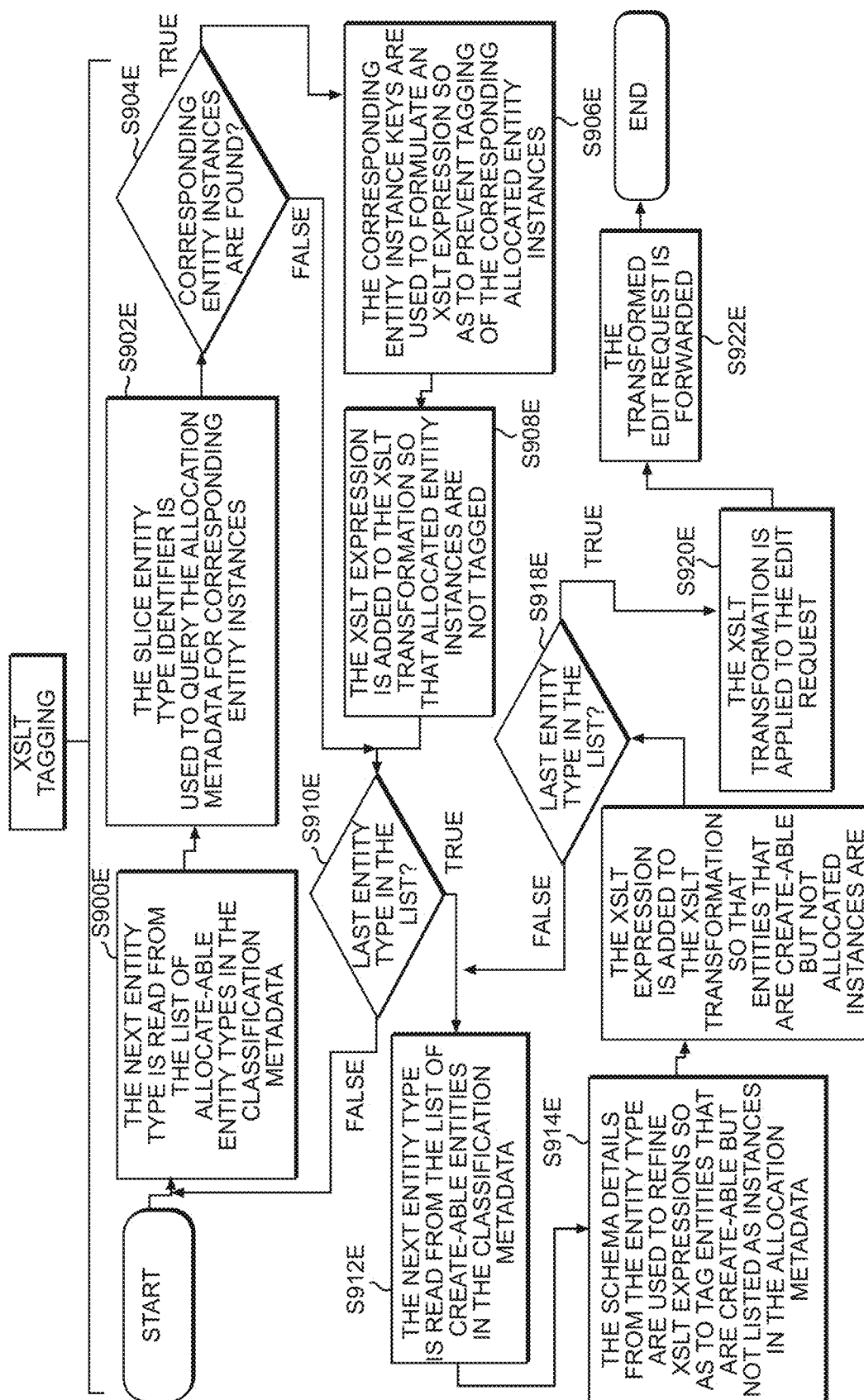
FIG. 9E is a flow chart illustrating a method according to one or more example embodiments.

FIG. 9E is a flow chart illustrating an example embodiment of the XSLT tagging shown in FIG. 9A. In discussing FIG. 9E, the NETCONF "EDIT-CONFIG" RPC is again referred to more generically as an edit request.

Referring to FIG. 9E, at step S900E the network management virtualizer 100 reads the next entity type from the list of allocate-able entity types in the classification metadata for the virtual network slice S-1.

At step S902E, the network management virtualizer 100 queries the allocation metadata for corresponding instances of the current entity type from the physical network datastore 1020 based on the entity type identifier for the current entity type in the classification metadata.

If the network management virtualizer 100 finds instances of the current entity type as a result of the query of the allocation metadata for instances of the current entity type at step S904E, then at step S906E the network management virtualizer 100 uses the corresponding entity instance keys to formulate an XSLT expression to prevent tagging of the corresponding allocated entity instances when the XSLT transformation is applied to the edit request.

At step S908E, the network management virtualizer 100 adds the XSLT expression to an XSLT transformation so that allocated entity instances are not tagged when the XSLT transformation is applied to the edit request.

At step S910E, the network management virtualizer 100 determines whether the current entity type is the last entity type in the list of allocate-able entity types.

If the current entity type is not the last entity type in the list of allocate-able entity types, then the process returns to step S900E and another iteration of the process is performed for the next entity type in the list of allocate-able entity types.

Returning to step S910E, if the current entity type is the last entity type in the list of allocate-able entity types, then at step S912E the network management virtualizer 100 reads the next entity type from the list of create-able entity types in the classification metadata for the virtual network slice S-1.

At step S914E, the network management virtualizer 100 refines the XSLT expression for the next entity type in the list of create-able of entity types based on schema details for the current entity type to tag the next entity type if the current entity type is not listed as an instance in the allocation metadata.

At step S916E, the network management virtualizer 100 adds the refined XSLT expression to the XSLT transformation. In so doing, if the current entity type is create-able, but not listed as an allocated instance, then the network management virtualizer 100 tags the current entity type when the XSLT transformation is applied to the edit request.

The network management virtualizer 100 determines whether the current entity type is the last network entity type in the list of create-able entity types in the classification metadata at step S918E.

If the current entity type is not the last entity type in the list of create-able network entity types, then the process returns to step S912E and continues as discussed herein for the next entity type in the list of create-able network entity types.

Returning to step S918E, if the current entity type is the last entity type in the list of create-able entity types, then at step S920E the network management virtualizer 100 applies the XSLT transformation to the edit request.

The transformed edit request is then forwarded to the physical network datastore 1020 at step S922E to configure (or edit the configuration of) the virtual network slice S-1. In at least one example embodiment, the transformed edit request may result in creation of a network entity (with the designated configuration) in the virtual network slice S-1. In another example, the transformed edit request may overwrite an existing configuration for an existing network entity in the virtual network slice S-1 (edit the configuration of the network entity).

An optional transformation of EDIT-CONFIG requests in at least one example embodiment may support allowing slice owners to create entity instances based on allocation metadata. In this case, the slice manager 110 may grant write-access to a slice owner for an entity instance with a specific key value, but the slice manager 110 does not create the entity instance with said key value. Instead, the slice owner may create the entity instance based on the allocation metadata, using the specified key value, and based on the fact that the corresponding entity type is listed as access-configurable in the classification metadata. This is in contrast to only allowing the slice owner to create entity instances based on the classification metadata list of create-able entity types.

An optional transformation of GET-CONFIG responses in accordance with at least one example embodiment may keep visible entity instances created by the slice manager 110 by default in any virtual network slice, where the corresponding entity types are not listed in the classification metadata at all, and there is no corresponding reference to these instances in the allocation metadata. In contrast, another different approach may not support this default visibility. That is, for example, unless an entity instance in a GET-CONFIG response has a corresponding entity type entry in the classification metadata (either access-configurable or create-able), then it is not visible in the GET-CONFIG response of a virtual network slice.

The XSLT technology used to transform the EDIT-CONFIG requests and responses is flexible, and thus, the manner in which change requests and responses are filtered or transformed against the classification and allocation metadata may be varied.

According one or more example embodiments, when a slice owner is configuring or editing configuration of network nodes (e.g., entities, entity instances, etc.) in a virtual network slice, the network management virtualizer 100 may validate changes to the virtual network slice based on additional user-defined rules expressed in a data-driven manner. For example, XQuery metadata rules may be expressed in the classification and allocation metadata so as to limit the range of virtual local area network (VLAN) identifiers (IDs) used in a virtual network slice. The XQuery rules may be arbitrarily defined based on the user requirements for the virtual network slice. The validation engine may be data-driven by the XQuery rules defined in the model-based classification metadata, combined with corresponding slice-specific values or limits in the allocation metadata. This enables the simpler application of rules via changes in the configurable metadata, rather than changes in code. A validation engine performs the validation during a physical network datastore validation phase (e.g., after changes are applied to generate the candidate physical network datastore, but before the changes are exposed to slice owners and the slice manager). This phase provides the opportunity to either accept or reject the changes and rollback to the physical network datastore prior to the changes if necessary. Some of the validation may be hard-coded (e.g., in Java using XSLT libraries) or driven by the virtual network slice classification and allocation metadata. The additional XQuery validation XML configuration may also be driven by the virtual network slice classification and allocation metadata. In at least one example, user-defined refers to defined by the slice manager 110 user via virtual network slice classification and allocation metadata configuration.

Edit requests such as EDIT-CONFIG RPCs from slice owners may also be validated to enforce maximum limits of entity instances per virtual network slice.

The network management virtualizer 100 may validate changes by validating a "candidate datastore." An example of a candidate datastore is specified in RFC 6421 by the IETF. A candidate datastore or candidate configuration datastore holds configuration data that may be manipulated without impacting a network entity's current configuration.

Figure 10:
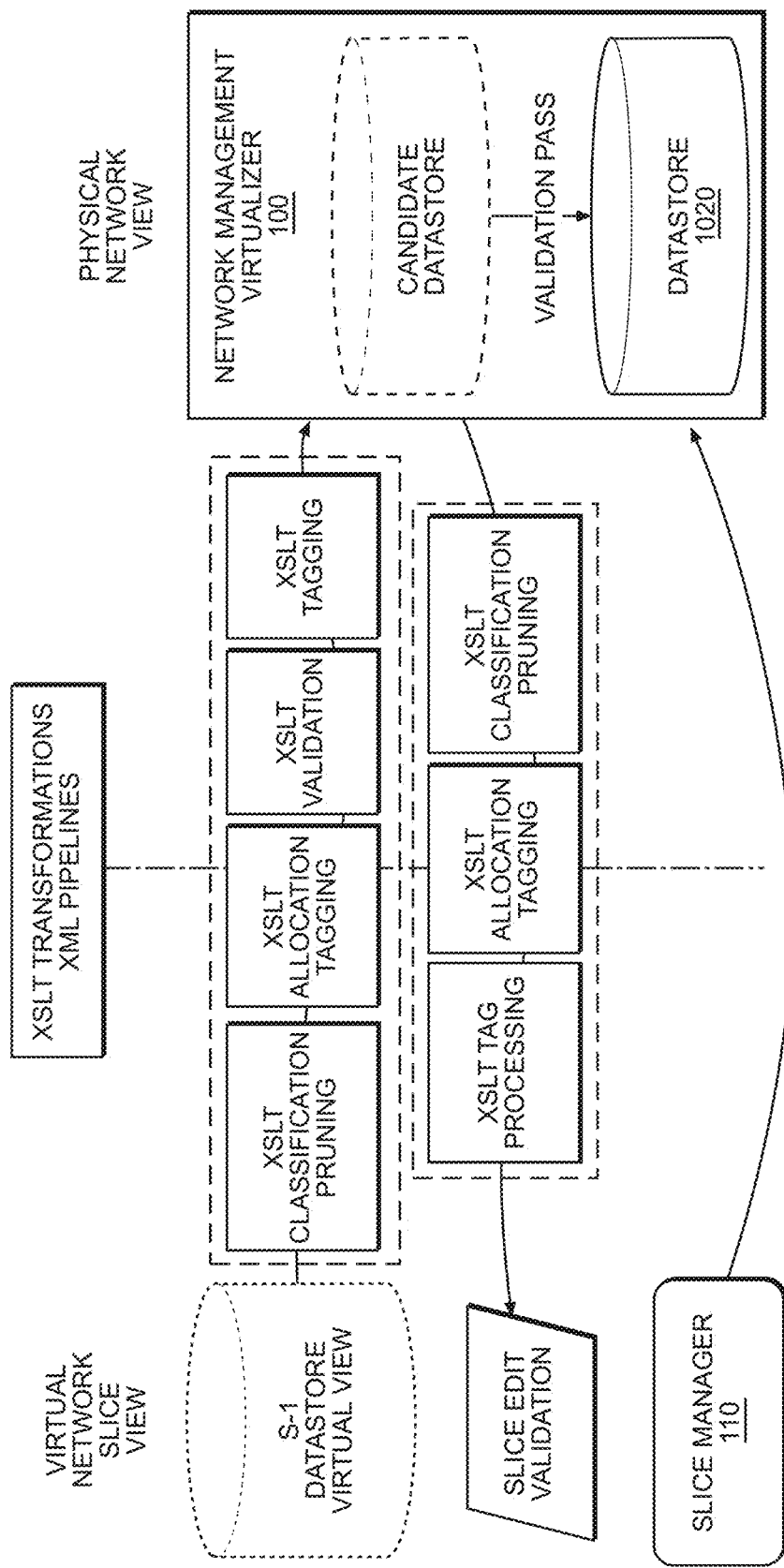
FIG. 10 is a flow diagram illustrating a method according to one or more example embodiments.
Figure 11:
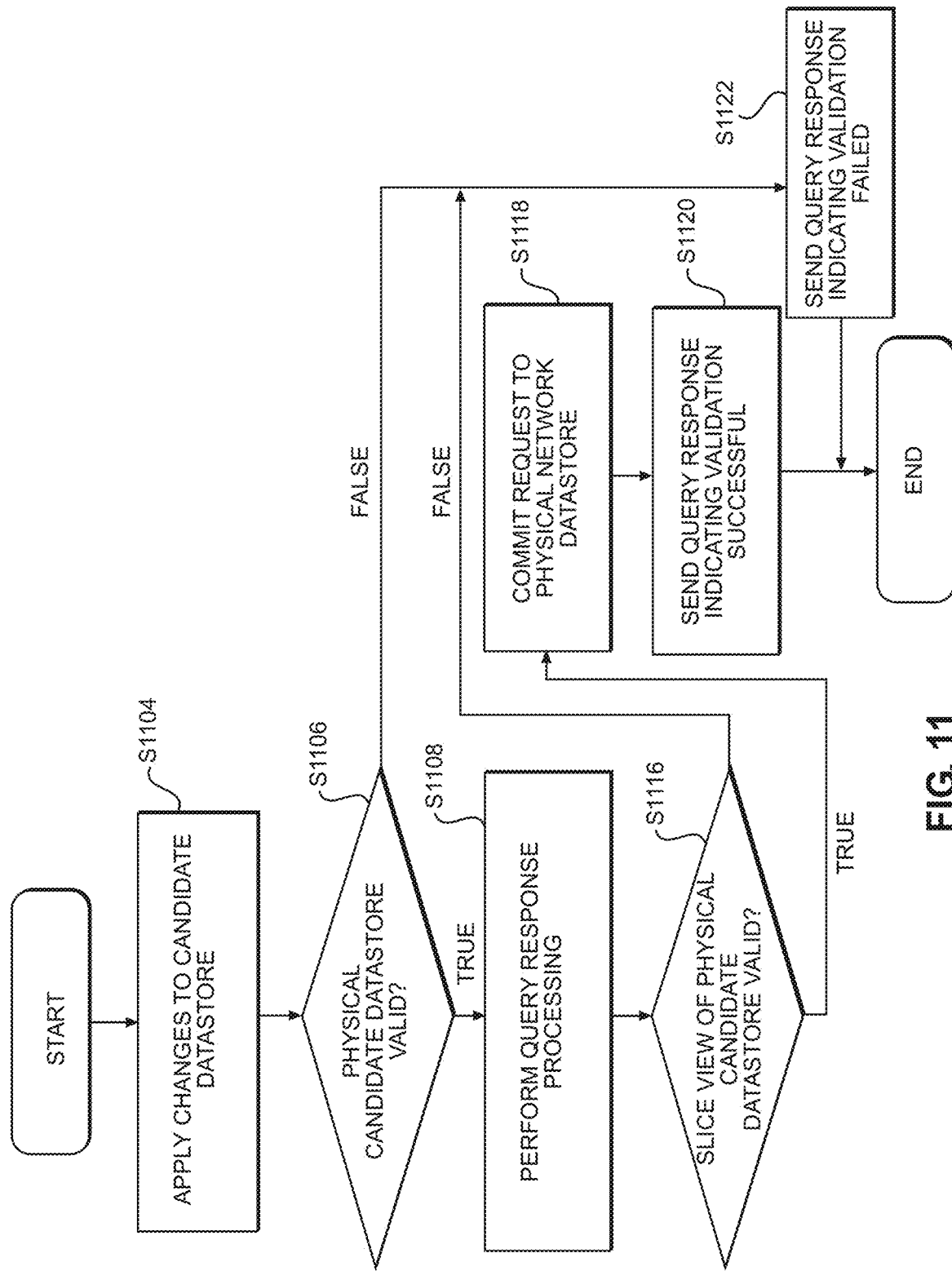
FIG. 11 is a flow chart illustrating a method according to one or more example embodiments.
Figure 12A:
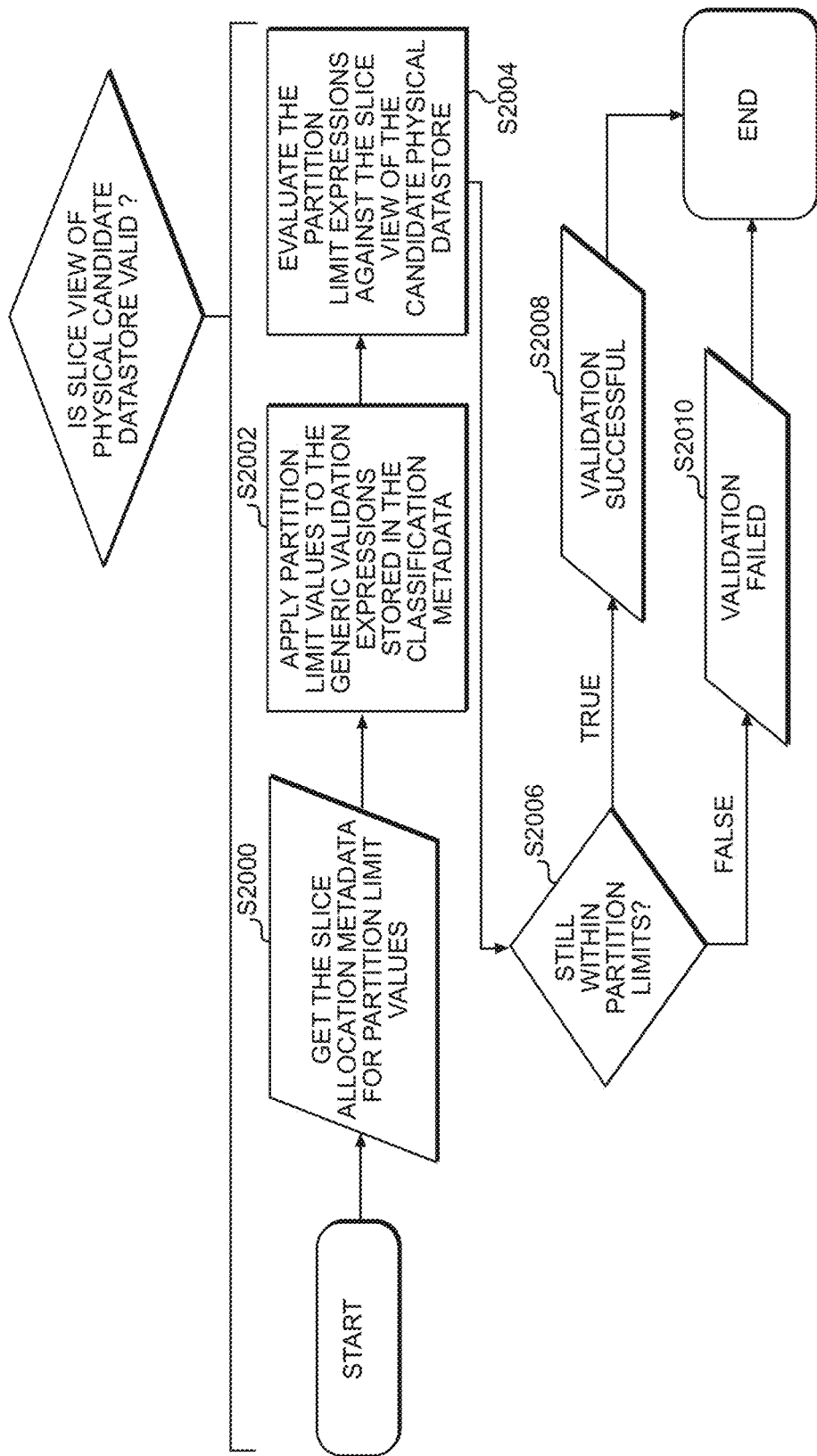
FIG. 12A is a flowchart illustrating a method according to one or more example embodiments.
Figure 12B:
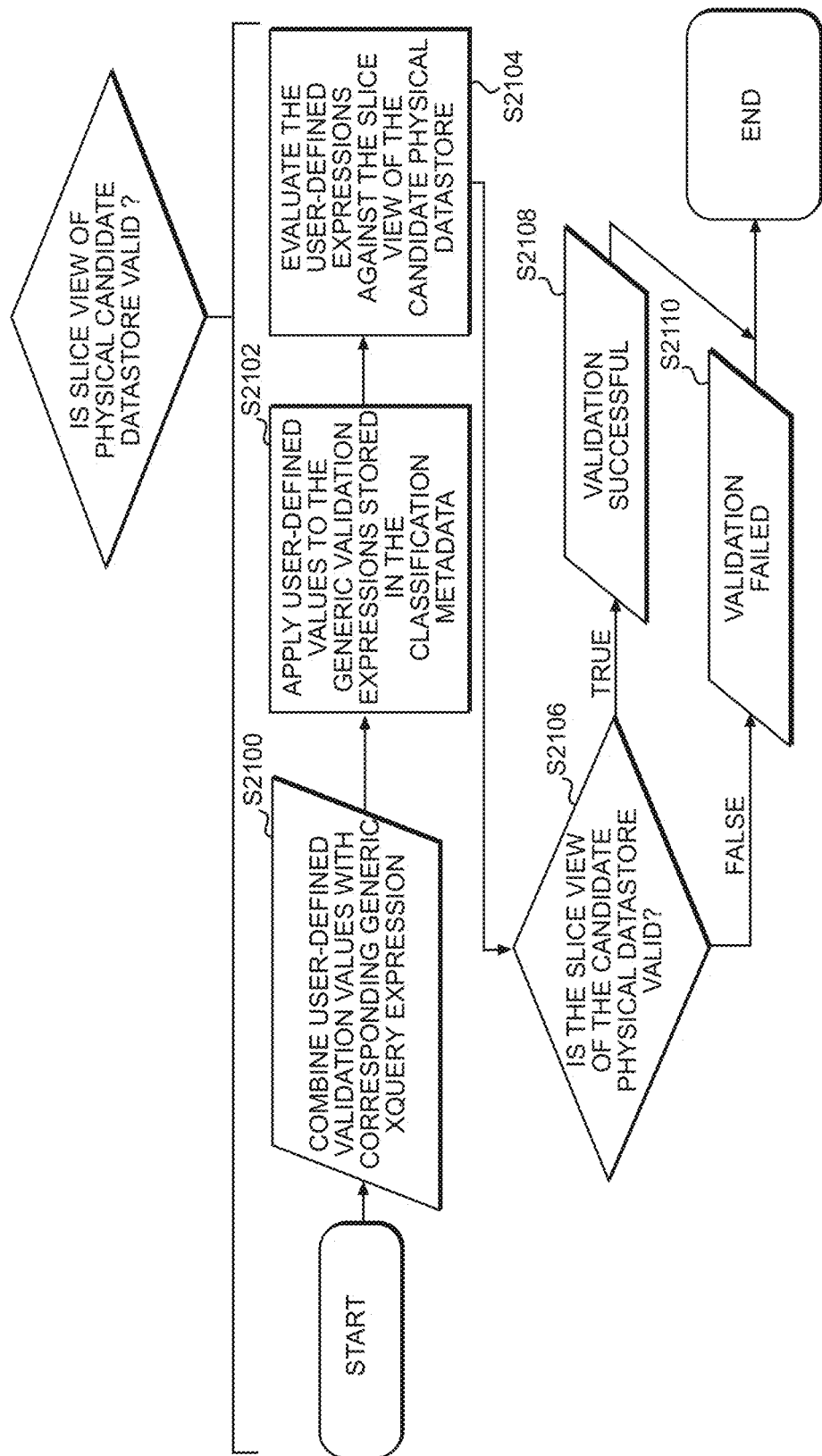
FIG. 12B is a flowchart illustrating a method according to one or more example embodiments.

FIG. 10 is a flow diagram illustrating a method for candidate datastore validation, according to one or more example embodiments. FIGS. 11, 12A and 12B are flow charts illustrating methods for candidate datastore validation, according to one or more example embodiments. For example purposes, FIGS. 11-12B are described more generically with regard to an edit request, rather than a RPC such as the "EDIT-CONFIG" RPC. Moreover, the example embodiments shown in FIGS. 11-12B will be discussed with regard to an edit request from the slice owner 110-S-1. However, it should be understood that the same or substantially the same validation procedure may be performed in response to edit (or other) requests from the slice manager 110.

In this example, once all modifications are applied to the candidate datastore based on one or more edit requests (e.g., EDIT-CONFIG RPCs) from the slice owner 110-S-1, a validation of the result is performed before the changes are committed to the actual physical network datastore 1020. One example constraint that may be enforced using this methodology is maximum bandwidth usage per PON port per virtual network slice.

Referring to FIGS. 10 and 11, at step S1104 the network management virtualizer 100 applies the changes for the virtual network slice S-1 specified in the edit request to the candidate datastore.

At step S1106, the network management virtualizer 100 determines whether the modified candidate datastore is valid by performing validation of referential integrity among others. For example, the network management virtualizer 100 validates whether any entity instance reference in the modified candidate datastore points to an existing corresponding entity instance entry in the candidate datastore, such that there cannot exist a reference without its corresponding entity instance entry in the candidate datastore.

If the modified candidate datastore is not valid, then at step S1122 the network management virtualizer 100 sends a reply (e.g., a query response) indicating that the validation procedure has failed. In this case, the requested changes are not committed to the actual physical network datastore 1020 and the process terminates.

Returning to step S1106, if the network management virtualizer 100 determines that the modified candidate datastore is valid, then at step S1108 the network management virtualizer 100 processes the query response as discussed above with regard to FIGS. 7A-7D. That is, for example, the network management virtualizer 100 performs XSLT classification pruning, XSLT allocation tagging and XSLT tag processing on the query response.

At step S1116, the network management virtualizer 100 determines whether the resultant virtual network slice view of the modified candidate datastore is valid based on the processed query response. In one example, the network management virtualizer 100 validates the partitioning limits of the virtual network slice S-1 (e.g., limits on the number of network entities created in the scope of a virtual network slice by a slice owner), which may be provisioned by the slice manager 110. These limits may be an optional part of the allocation metadata. Other forms of limits may be enforced via user-defined rules, using generic XQuery expressions in classification metadata combined with corresponding slice-specific limits in allocation metadata. These include, but are not limited to, the virtual network slice bandwidth usage on a port. Methods for determining whether the resultant network slice view of the modified candidate datastore is valid will be discussed in more detail below with regard to FIGS. 12A and 12B.

If the network management virtualizer 100 determines that the resultant network slice view is valid, then at step S1118 the network management virtualizer 100 commits the requested changes to the physical network datastore 1020. The network management virtualizer 100 then outputs the query response indicating that the validation of the virtual network slice view was successful at step S1120.

Returning to step S1116, if the network management virtualizer 100 determines that the resultant network slice view is not valid, then the network management virtualizer 100 proceeds to step S1122 and continues as discussed above.

FIG. 12A is a flowchart illustrating a method for determining whether the resultant network slice view of the candidate physical network datastore is valid, according to one or more example embodiments. For example purposes, the method shown in FIG. 12A will be discussed with regard to partition limit values for a network entity in the virtual network slice S-1 in FIG. 1. However, the method shown in FIG. 12A may be applicable to other operations.

Partitioning is a relatively simple type of validation and refers to limiting the number of entities of a certain type that can be created within a slice. For example, one may specify the maximum number of ONTs that may be created in a virtual network slice.

Referring to FIG. 12A, at step S2000 the network management virtualizer 100 obtains the partition limit values from the allocation metadata for the entity type.

At step S2002, the network management virtualizer 100 applies partition limit values to the generic validation expressions stored in the classification metadata for the virtual network slice S-1.

Partition limit expressions are relatively simple and deal with limiting the creation of instances of a given type. In contrast, user-defined validation expressions are generic XQuery expressions that may perform more complex checks, such as summing up an attribute value across a filtered list of resources within the virtual network slice and comparing the sum with a configurable limit. For example, one can specify an upper limit for the configured committed bit-rate (attribute value) of all user-to-network interfaces (filtered list of resources) created in a virtual network slice. The generic XQuery expressions are specified in the classification metadata based on the model of the device. The generic XQuery expression is combined with corresponding values or limits specified in the allocation metadata corresponding to a slice instance in a device instance. This enables the same model-based generic XQuery expression to be applied differently on a slice-instance basis.

At step S2004, the network management virtualizer 100 evaluates the partition limit expressions against the virtual network slice view of the candidate datastore to determine whether the candidate datastore is still within the partition limits obtained from the allocation metadata. For example, the network management virtualizer 100 counts the created entity instances within the virtual network slice and compares the count with the configured partition-limit.

If the network management virtualizer 100 determines that the candidate datastore is still within the partition limits obtained from the allocation metadata at step S2006 (e.g., number of entities is less than or equal the partition limit) then the network management virtualizer 100 determines that the candidate datastore is valid (validation successful) at step S2008.

Returning to step S2006, if the network management virtualizer 100 determines that the candidate datastore is no longer within the partition limits obtained from the allocation metadata (e.g., number of entities is greater than the partition limit), then the network management virtualizer 100 determines that the candidate physical network datastore is invalid (validation failed) at step S2010.

FIG. 12B is a flowchart illustrating a method for determining whether the resultant virtual network slice view of the candidate datastore is valid based on user-defined validation XQuery expressions according to one or more example embodiments. In this example, the user may be the slice manager 110. For example purposes, the method shown in FIG. 12B will be discussed with a network entity in the virtual network slice S-1 in FIG. 1.

Referring to FIG. 12B, at S2100 the network management virtualizer 100 combines user-defined validation values (e.g., limits, etc.) from the allocation metadata with a corresponding generic XQuery expression in the classification metadata.

At step S2102, the network management virtualizer 100 applies user-defined values to the generic validation expressions stored in the classification metadata for the virtual network slice S-1. In this example, the user (e.g., slice manager 110) specifies a VLAN identifier range (e.g., minimum identifier value and maximum identifier value) as arguments of the corresponding XQuery validation expression.

At step S2104, the network management virtualizer 100 evaluates the user-defined expressions against the virtual network slice view of the candidate physical network datastore to determine whether the virtual network slice view of the candidate datastore is valid. The evaluation at step S2104 may be the same or substantially the same as step S2004 in FIG. 12A.

If the network management virtualizer 100 determines that the virtual network slice view of the candidate datastore is valid at step S2106, then the network management virtualizer 100 determines that the candidate datastore is valid (validation successful) at step S2108.

Returning to step S2106, if the network management virtualizer 100 determines that the virtual network slice view of the candidate datastore is not valid, then the network management virtualizer 100 determines that the virtual network slice view of the candidate datastore is not valid (validation failed) at step S2110.

According to one or more example embodiments, the network management virtualizer 100 may send autonomous notifications (e.g., NETCONF notifications) to slice owners. A state change in the network management virtualizer 100 may cause the network management virtualizer 100 to output an autonomous notification. In at least one example embodiment, a state change may include a network device becoming unreachable, a change in the configuration of a network device, etc. When these states are relevant for a virtual network slice, the network management virtualizer 100 may send a notification to the corresponding slice owner.

The network management virtualizer 100 may XSLT-transform the autonomous notifications from the physical network datastore to the projected virtual network slice view. By contrast, the network management virtualizer 100 may send the same autonomous notifications directly to the slice manager 110 without filtering or XSLT-transformation. In at least one example embodiment, autonomous notifications may include operational information from the network, rather than network configuration information from the physical network datastore 1020.

Figure 13:
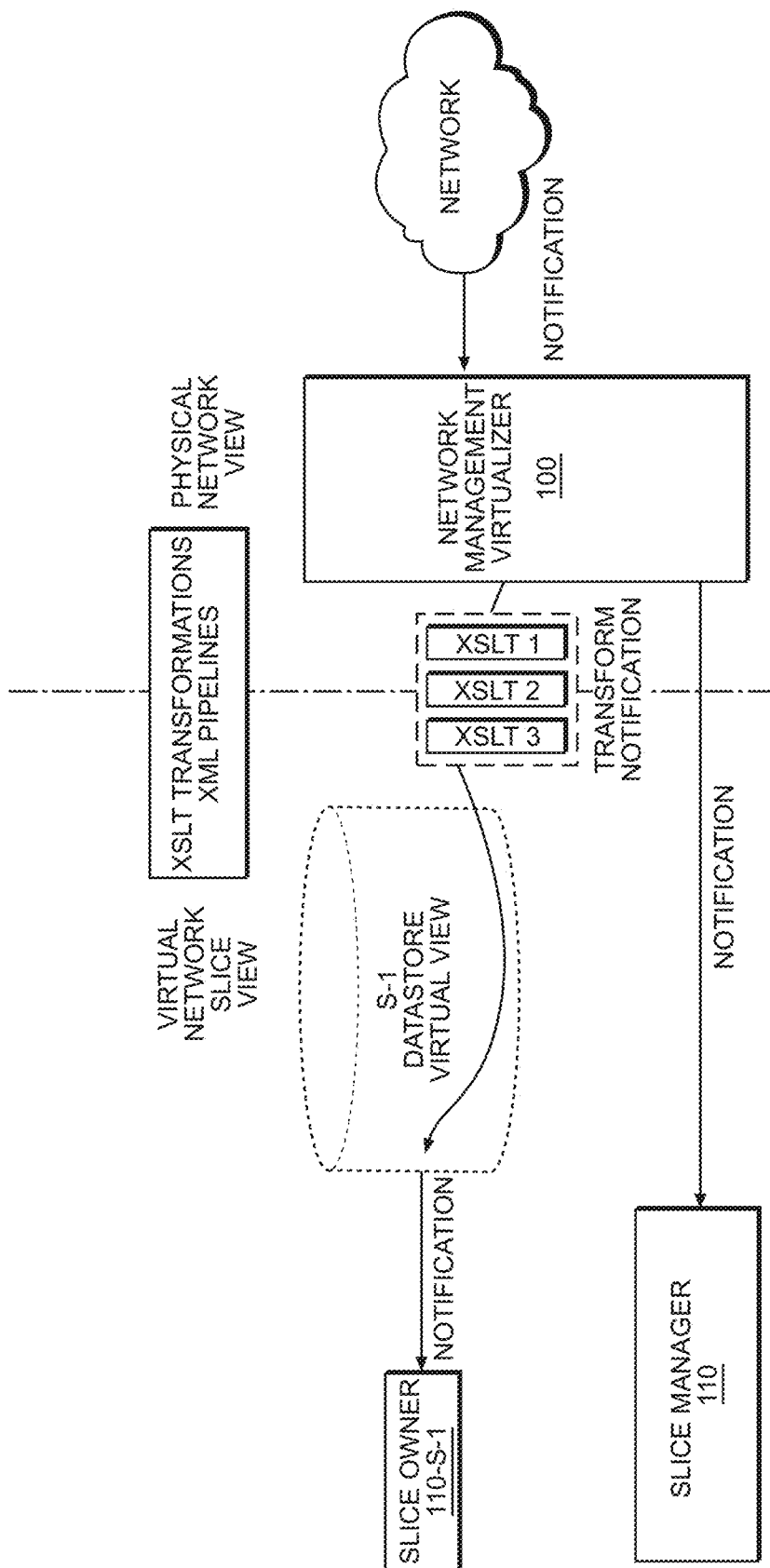
FIG. 13 is an embedded flow diagram illustrating a method according to one or more example embodiments.
Figure 14:
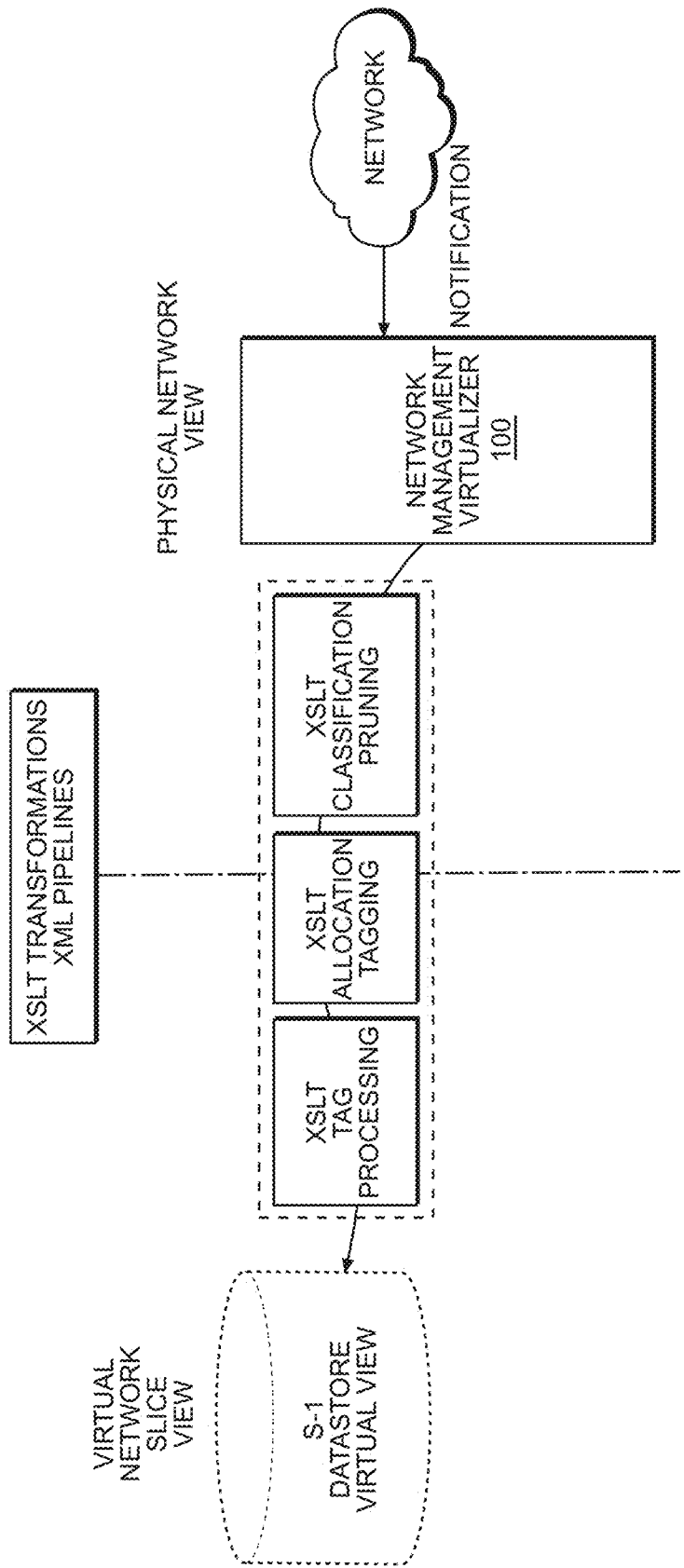
FIG. 14 is an embedded flow diagram illustrating a method according to one or more example embodiments.

FIG. 13 is a flow diagram illustrating a method for autonomous notification according to one or more example embodiments. FIG. 14 is a flow diagram illustrating the XSLT transformation performed on an autonomous notification from the network management virtualizer 100 to the slice owner 110-S-1 in more detail. For example purposes, FIGS. 13 and 14 will be discussed with regard to NETCONF notifications. However, example embodiments may be applicable to other network management protocols such as SNMP.

According to one or more example embodiments, a slice manager may receive performance monitoring notifications, alarm notifications, status update notifications, etc., for any/all network entities, whereas a slice owner may receive said notifications for only network entities visible in the virtual network slice view.

Referring to FIGS. 13 and 14, the XSLT transformations applied to the autonomous NETCONF notifications include XSLT classification pruning, XSLT allocation tagging and XSLT tag processing. These XSLT transformations are substantially the same as those discussed above with regard to FIGS. 7A-7D, except that the XSLT transformations are applied to operational information for the physical network, rather than the network configuration information. Because the XSLT transformations are the same as those discussed above with regard to FIGS. 7A-7D, a detailed discussion is omitted.

Figure 15:
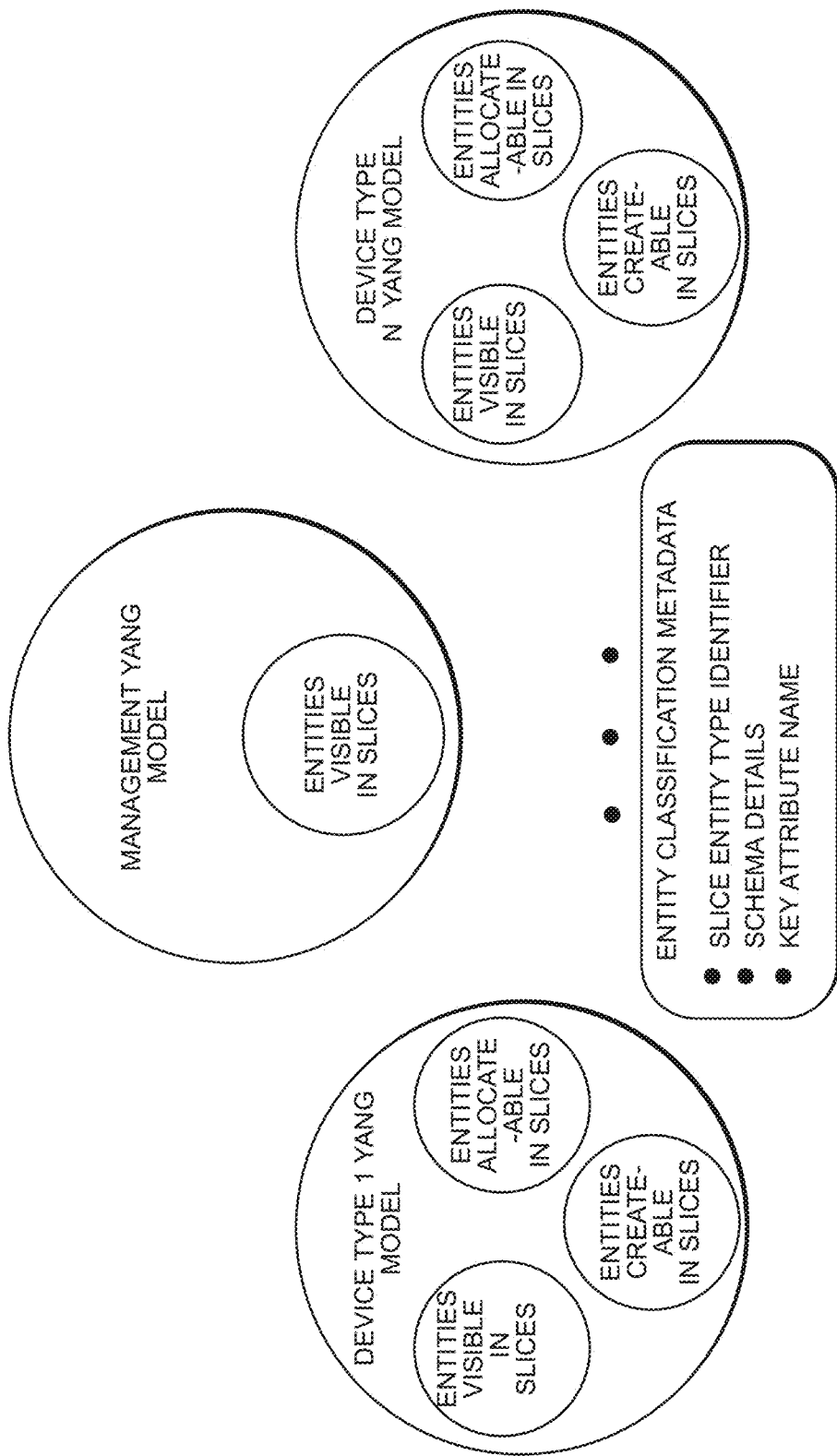
FIG. 15 illustrates classification metadata according to one or more example embodiments.

FIG. 15 is a diagram illustrating classification of entity types for virtual network slice filtering according to one or more example embodiments.

Referring to FIG. 15, "Entities visible in slices" define subtrees and leaves of entities that are visible in slices based on entity types in the management model. This may be specified for the management model as well as individual device type models.

"Entities allocate-able in slices" define the network entities (e.g., via a list) that may be allocated to a virtual network slice by the slice manager using allocation metadata. A given entity instance in the allocation metadata is linked via the "slice entity type identifier" to the corresponding entity classification metadata. As shown in FIG. 15, the classification metadata for an entity includes a slice entity type identifier, schema details and a key attribute name.

"Entities create-able in slices" define the network entities (e.g., via a list) that may be created by a slice owner or created and allocated by a slice manager. If created by a slice owner, then the network entities may be key tagged in the physical network datastore to associate the network entity with one or more virtual network slices. These network entities may be specified using the local name and name space of the subtree root node representing the network resource. According to one or more example embodiments, a subtree leaf and its value may be used to discriminate among sub-types of the same entity type. This may be useful in the case where entities of type "interface" and sub-type "A" may be created by the slice owner, but entities of type "interface" and sub-type "B" may not be created by the slice owner. If no discriminator leaf and value is specified, then all entities of type "interface" may be created by the slice owner.

A subset of "Entities create-able in slices" are subtree leaves that refer to other entities using the YANG leaf-ref construct (also referred to as entity references). Entity references utilize a "referential integrity" validation in order to ensure that the network entity pointed to exists and is accessible within the same virtual network slice.

One or more example embodiments enable delegating referential integrity validation to the physical network datastore NETCONF request processing (e.g., the default NETCONF stack). If the slice owner specifies an entity reference in a request for an entity instance that is not explicitly allocated in the virtual network slice, then it is assumed that the entity instance must have been created by the slice owner and the instance key in the entity reference is automatically tagged in the XSLT transformation. If the entity instance being referred to was not created by the slice owner, then the default NETCONF stack will validate and fail the request as it will not find an instance with the specified tagged key. This may provide an improvement over performing redundant referential integrity validation in a projected slice view in addition to the physical network datastore.

Figure 16:
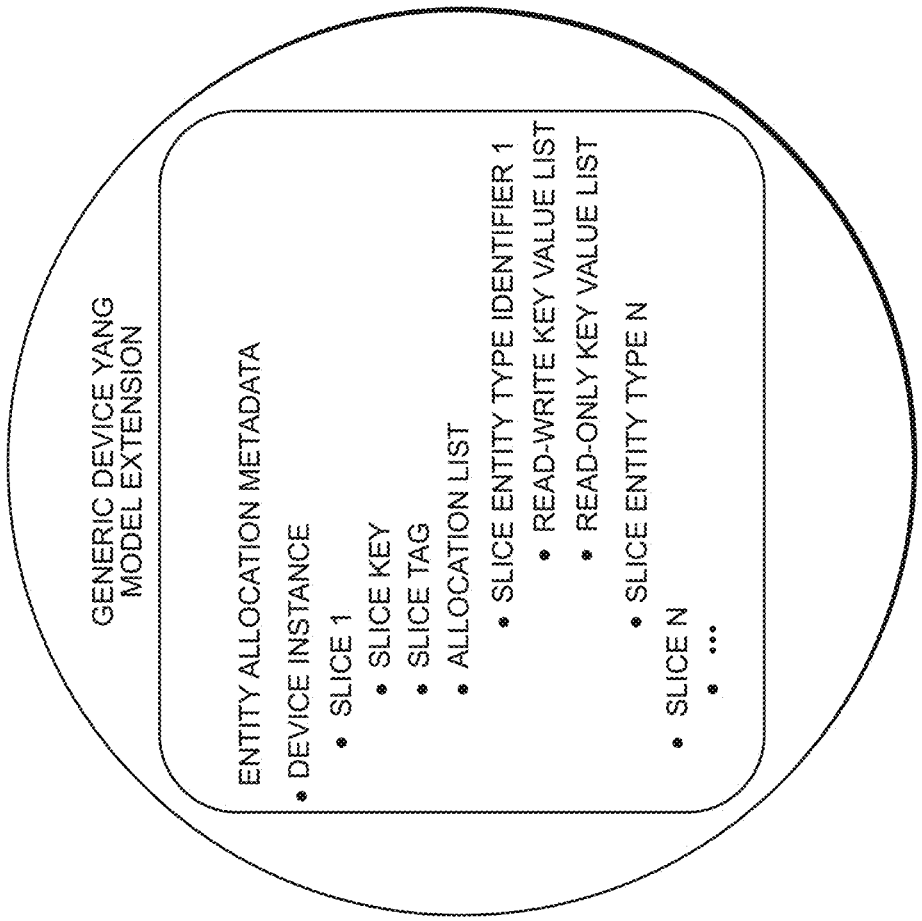
FIG. 16 illustrates allocation metadata according to one or more example embodiments.

FIG. 16 is a diagram depicting an example embodiment of a structure of entity allocation metadata. This approach of explicitly assigning instances of network entities to virtual network slices is similar to Flowvisor in Software-Defined Networks (SDN) using OpenFlow. In at least this implementation, "Entity allocation metadata" is used to complement "Entity type classification metadata" and key tagging.

Figure 17:
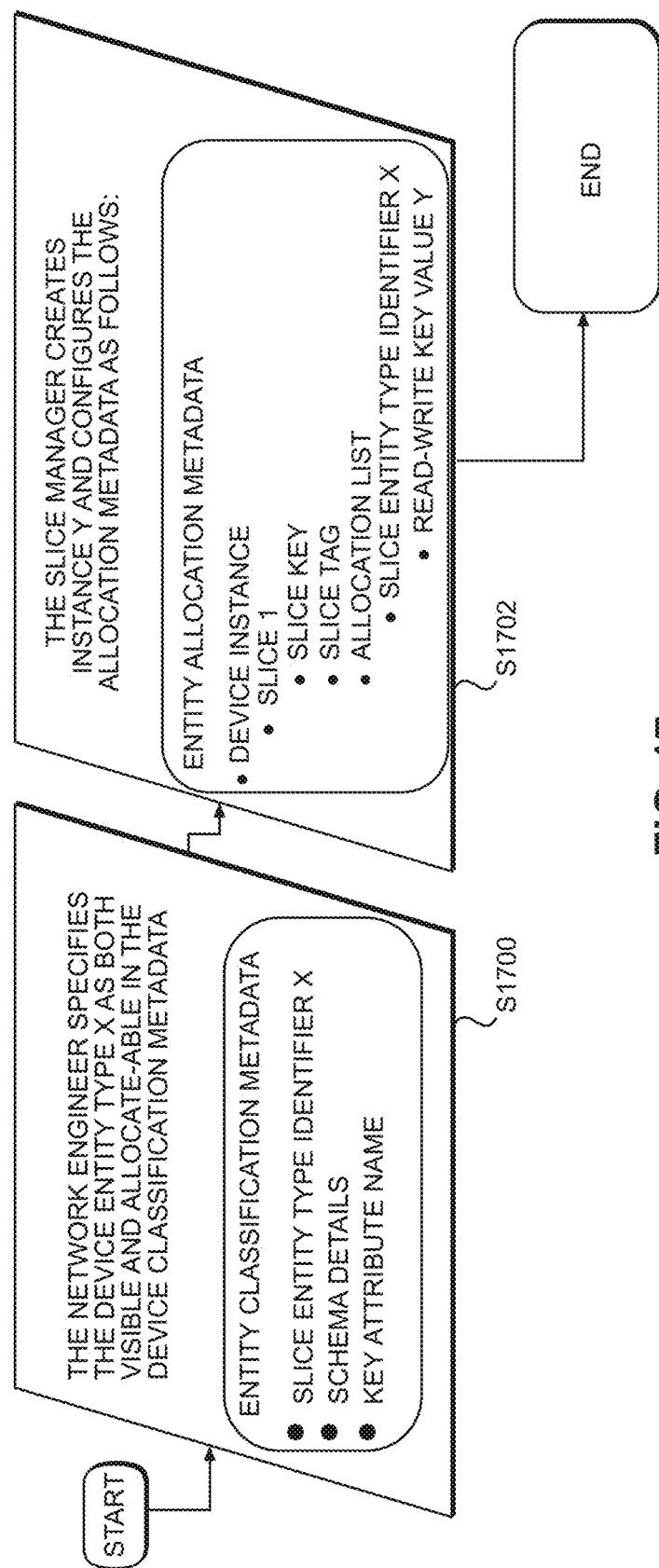
FIG. 17 is a flow chart illustrating a method according to one or more example embodiments.

FIG. 17 is a flowchart illustrating a method of configuring entity classification and entity allocation metadata according to one or more example embodiments.

Referring to FIG. 17, at step S1700 the network engineer configures the entity classification metadata for an entity instance. In this example, the network engineer specifies that the entity type for the entity instance is visible and allocateable. As shown, the entity classification metadata for entity type X includes a slice entity type identifier X, schema details and a key attribute name.

At S1702, the slice manager then creates instance Y of the entity type X and configures the allocation metadata for entity instance Y based on the entity classification metadata configured by the network engineer. In at least one example embodiment, the slice entity type identifier X is referenced from the entity allocation metadata to the entity classification metadata.

As a result of the example embodiment shown in FIG. 17, instance Y of entity type X is read-write accessible to the slice owner(s) of the given virtual network slice. That is, for example, attributes of instance Y may be modified by the slice owner(s) of the given virtual network slice.

As discussed in detail above, the classification metadata and the allocation metadata for a given entity instance drive the XSLT-transformations used to project the slice view of the physical network datastore to the slice owner.

Figure 18:
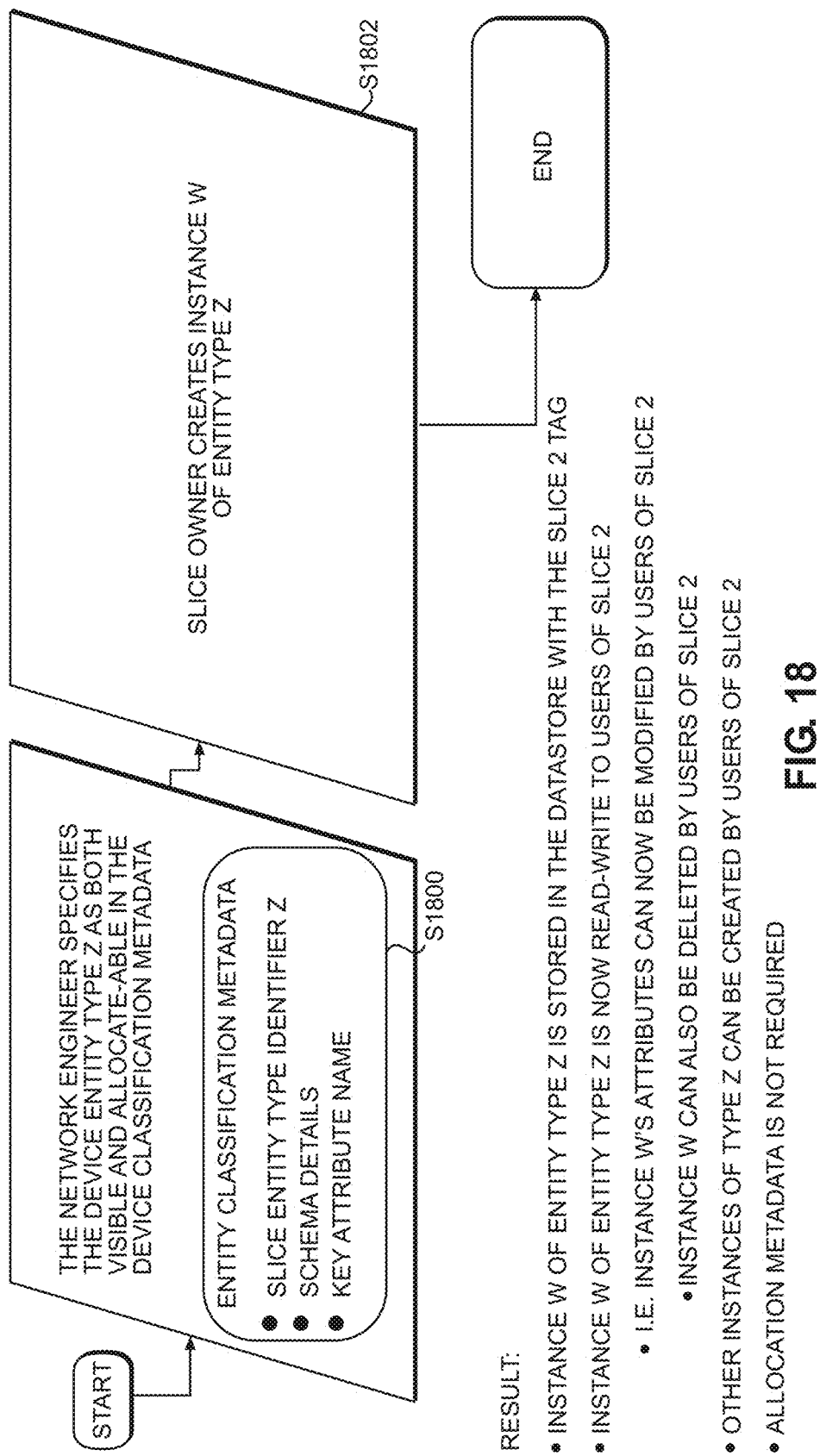
FIG. 18 is a flow chart illustrating a method according to one or more example embodiments.

FIG. 18 is a flowchart illustrating a method for driving key tagging of entity instances created by a slice owner using classification metadata, according to one or more example embodiments. For example purposes, the flowchart in FIG. 18 will be described with regard to creation of entity instance W and entity type Z in a virtual network slice.

Referring to FIG. 18, at step S1800 a network engineer configures the classification metadata to specify that device entity types with device entity type identifier Z (device entity type Z) are both visible and create-able. The network engineer may configure the device classification metadata at step S1800 in the same or substantially the same manner as at step S1700.

At S1802, the slice owner creates the entity instance W of entity type Z in the virtual network slice based on the classification metadata configured at step S1800. Accordingly, the entity instance W is visible and create-able in the virtual network slice.

As a result of the example embodiment shown in FIG. 18, the instance W of the entity type Z is stored in the physical network datastore and tagged with a tag corresponding to the virtual network slice, and instance W of entity type Z is read-write accessible by slice owner(s) of the virtual network slice; that is, for example, attributes of instance W may be modified or deleted by slice owner(s) of the virtual network slice, and other instances of entity type Z may be created by slice owner(s) of the virtual network slice.

Recursive or hierarchical slicing may be supported as defined in Network Slicing Architecture draft-geng-netslices-architecture-01 dated Jun. 2, 2017 by the Internet Engineering Task Force (IETF) Network Working Group (NWG). In this case, a slice owner in the first level of slicing acts as a slice manager for the second level of slicing. Tags are incrementally applied to key values from one level to the next.

The centralized physical network datastore maintains a master copy of all network management virtualizer and device-specific data for all devices in the scope of the network manager. There is no data duplication in the sense that a single master copy is maintained for the scope of the network management virtualizer and all devices in that scope. However, this does not prevent data from being disseminated from the network management virtualizer to individual devices as needed for the devices to operate. A device may or may not persist its slave copy of the data as needed for its operation. The slave data is not considered duplicated for the purposes of example embodiments given that the single centralized master copy is the only reference data used and enforced across all devices.

The centralized physical network datastore may optionally be distributed, while maintaining a single master copy of the data in either centralized or distributed manner. An example of distributed datastore involves having each network device maintain a master copy of its own data, instead of having the network management virtualizer maintain a master copy of all device-specific data for all devices. The same network slicing solution applies except that the validation of changes applied to the datastore on the device has to be performed on the device. In this case, the device should be slice aware for slicing-specific validation to be performed on the device. Alternately, slicing-specific datastore validation may either be omitted or performed against the edit requests only in the network management virtualizer using a different approach (e.g., a request-based validation approach instead of datastore-based validation approach).

A slice owner may not have access to all NETCONF RPC types. Typically, a slice owner may only be authorized to access a subset of all RPC types (e.g., GET, GET-CONFIG, EDIT-CONFIG, but not COPY-CONFIG, etc.). User management authentication and authorization is also used to identify slice owners and manage slice owner access to a specific slice, via the various network management virtualizer user-accessible interfaces. Similarly, authentication and authorization may be used to manage the slice manager access.

Figure 19:
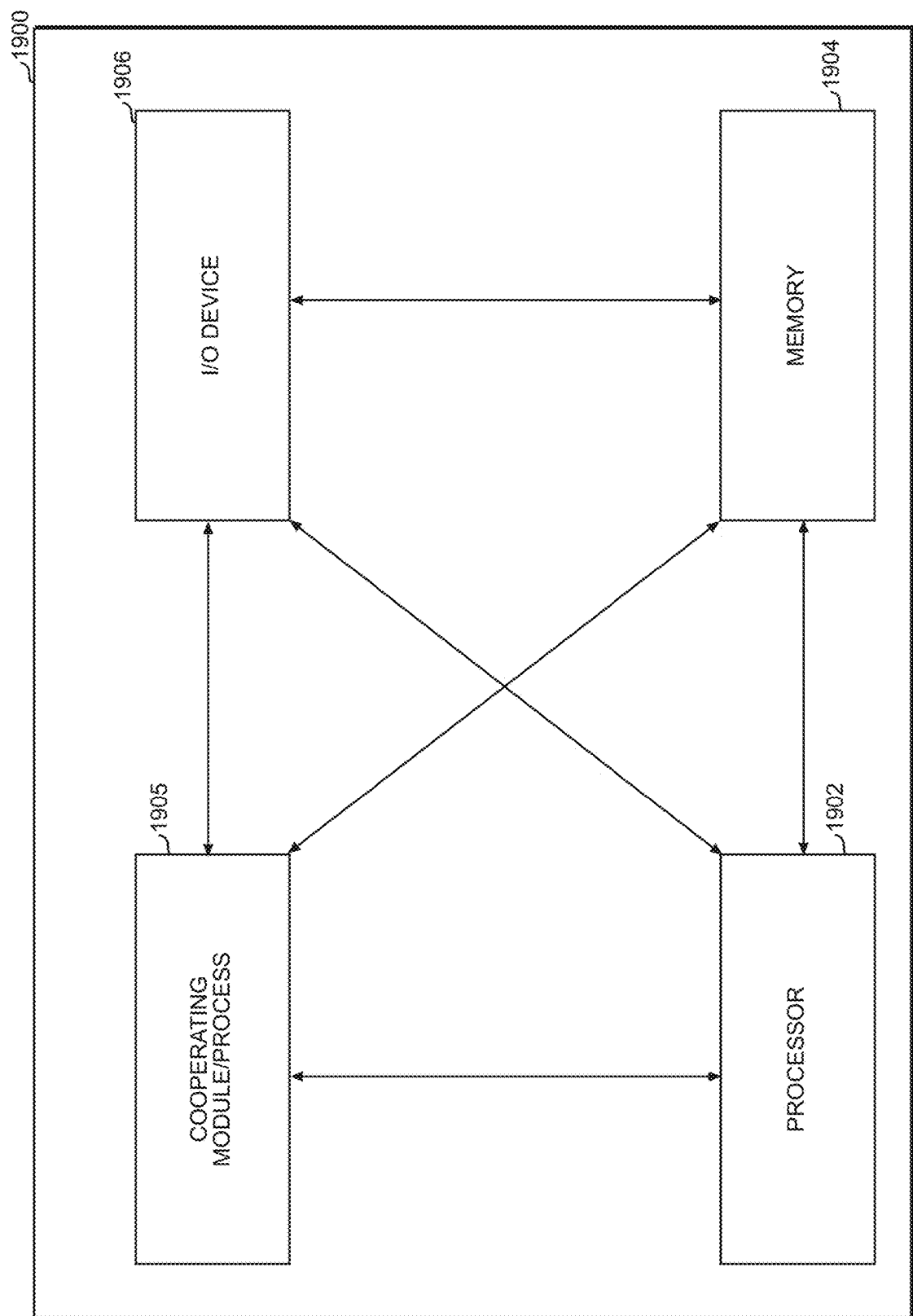
FIG. 19 provides a general architecture and functionality suitable for implementing functional elements described herein or portions of functional elements described herein.

FIG. 19 depicts a high-level block diagram of a computer, computing or electronic device suitable for use in implementing, inter alia, network management virtualizer, nodes, as well as other network elements and/or devices.

Referring to FIG. 19, the computer 1900 includes one or more processors 1902 (e.g., a central processing unit (CPU) or other suitable processor(s)) and a memory 1904 (e.g., random access memory (RAM), read only memory (ROM), and the like). The computer 1900 also may include a cooperating module/process 1905. The cooperating process 1905 may be loaded into memory 1904 and executed by the processor 1902 to implement functions as discussed herein and, thus, cooperating process 1905 (including associated data structures) may be stored on a computer readable storage medium (e.g., RAM memory, magnetic or optical drive or diskette, or the like).

The computer 1000 also may include one or more input/output devices 1906 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof.).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing CPE devices, Distribution Point Units (DPUs), network management virtualizers, network management entities, clients, gateways, nodes, agents, controllers, computers, cloud based servers, web servers, proxies or proxy servers, application servers, load balancers or load balancing servers, heartbeat monitors, device management servers, or the like. As discussed later, such existing hardware may include, inter alia, one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

The terms "including" and/or "having", as used herein, are defined as comprising (i.e., open language). The term "coupled", as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, CPE devices, endpoints, DPUs, network management virtualizers, network management entities, clients, gateways, nodes, agents controllers, computers, cloud based servers, web servers, application servers, proxies or proxy servers, load balancers or load balancing servers, heartbeat monitors, device management servers, or the like, may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

The CPE devices, endpoints, DPUs, network management virtualizers, network management entities, clients, gateways, nodes, agents, controllers, computers, cloud based servers, web servers, application servers, proxies or proxy servers, load balancers or load balancing servers, heartbeat monitors, device management servers, or the like, may also include various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more network elements, such as switches, gateways, termination nodes, controllers, servers, clients, and the like.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A network management system for managing a plurality of virtual network slices in a physical network, the network management system comprising:
   at least one memory storing computer readable instructions; and
   at least one processor configured to execute the computer readable instructions to cause the network management system to, in response to receiving a request message from a first slice owner,
      filter the request message from the first slice owner by applying at least one transformation to the request message to generate a transformed request message, the request message being encoded in XML,
      generate filtered network information by filtering first network information in response to the transformed request message, the first network information including network information for a first plurality of network entities, the first plurality of network entities including at least one or more network entities assigned to a first virtual network slice from among the plurality of virtual network slices, the filtering including filtering the first network information such that the filtered network information includes network information for only one or more network entities assigned to the first virtual network slice from among the plurality of virtual network slices, the first network information including at least one of (i) operational information obtained from the physical network or (ii) network configuration information obtained from a physical network datastore, and
      provide the filtered network information to the first slice owner of the first of the plurality of virtual network slices.

2. The network management system of claim 1, wherein the filtered network information is provided via one of a NETCONF RESPONSE or NOTIFICATION message.

3. The network management system of claim 1, wherein the request message is a NETCONF message.

4. The network management system of claim 3, wherein the NETCONF message is one of a GET, GET-CONFIG or EDIT-CONFIG message.

5. The network management system of claim 1, wherein the at least one processor is further configured to execute the computer readable instructions to cause the network management system to filter the request message by applying a plurality of XSLT transformations sequentially to generate the transformed request message.

6. The network management system of claim 5, wherein the plurality of XSLT transformations includes at least one of XSLT classification pruning, XSLT allocation pruning, XSLT validation or XSLT tagging.

7. The network management system of claim 1, wherein the request message is a NETCONF message; and
   the at least one processor is further configured to execute computer readable instructions to cause the network management system to
      modify a candidate datastore based on the request message,
      determine whether the modified candidate datastore is valid, and
      selectively update the physical network datastore according to the modified candidate datastore based on whether the modified candidate datastore is valid.

8. The network management system of claim 7, wherein the at least one processor is further configured to execute computer readable instructions to cause the network management system to
   update the physical network datastore in response to determining that the modified candidate datastore is valid, and
   reject the modified candidate datastore in response to determining that the modified candidate datastore is not valid.

9. The network management system of claim 1, wherein the network information is in the form of an encoded document; and
   the at least one processor is further configured to execute the computer readable instructions to cause the network management system to filter the network information by applying at least one transformation to the encoded document to generate a transformed encoded document including the filtered network information.

10. The network management system of claim 9, wherein the encoded document is an XML document; and
    the at least one transformation includes at least one XSLT transformation.

11. The network management system of claim 10, wherein the at least one processor is further configured to execute the computer readable instructions to cause the network management system to filter the network information by applying a plurality of XSLT transformations sequentially to generate the transformed encoded document.

12. A method for managing a plurality of virtual network slices in a physical network, the method comprising:

in response to a request message from a first slice owner, the request message being encoded in XML, filtering the request message by applying at least one transformation to the request message to generate a transformed request message;

generating filtered network information by filtering first network information in response to the transformed request message, the first network information including network information for a first plurality of network entities, the first plurality of network entities including at least one or more network entities assigned to a first virtual network slice from among the plurality of virtual network slices, the filtering including filtering the first network information such that the filtered network information includes network information for only one or more network entities assigned to the first virtual network slices from among the plurality of virtual network slices, the first network information including at least one of (i) operational information obtained from the physical network or (ii) network configuration information obtained from a physical network datastore; and providing the filtered network information to a first slice owner of the first of the plurality of virtual network slices.

13. The method of claim 12, wherein the providing provides the filtered network information via one of a NETCONF RESPONSE or NOTIFICATION message.

14. The method of claim 12, wherein the request message is a NETCONF message.

15. The method of claim 14, wherein the NETCONF message is one of a GET, GET-CONFIG or EDIT-CONFIG message.

16. A non-transitory computer readable storage medium storing computer-executable instructions that, when executed by one or more processors of a network management system, cause the network management system to perform a method for managing a plurality of virtual network slices in a physical network, the method comprising:

in response to a request message from a first slice owner, the request message being encoded in XML, filtering the request message by applying at least one transformation to the request message to generate a transformed request message;

generating filtered network information by filtering first network information in response to the transformed request message, the first network information including network information for a first plurality of network entities, the first plurality of network entities including at least one or more network entities assigned to a first virtual network slice from among the plurality of virtual network slices, the filtering including filtering the first network information such that the filtered network information includes network information for only one or more network entities assigned to the first virtual network slices from among the plurality of virtual network slices, the first network information including at least one of (i) operational information obtained from the physical network or (ii) network configuration information obtained from a physical network datastore; and providing the filtered network information to a first slice owner of the first of the plurality of virtual network slices.

* * * * *